US012694455B1

(12) United States Patent
Fleming

(10) Patent No.: US 12,694,455 B1
(45) Date of Patent: Jul. 28, 2026

(54) ARTIFACT REGISTRATION AND VERIFICATION SYSTEM

(71) Applicant: Moat Metrics, Inc., Spokane, WA (US)

(72) Inventor: Samuel Cameron Fleming, Spokane, WA (US)

(73) Assignee: AON RISK SERVICES, INC. OF MARYLAND, New York, NY (US)

( * ) Notice: Subject to any disclaimer, the term of this patent is extended or adjusted under 35 U.S.C. 154(b) by 74 days.

(21) Appl. No.: 18/387,458

(22) Filed: Nov. 6, 2023

(51) Int. Cl.
G06Q 40/08 (2012.01)

(52) U.S. Cl.
CPC ........... G06Q 40/084 (2025.08); G06Q 40/08 (2013.01); G06Q 40/09 (2025.08)

(58) Field of Classification Search
CPC ....... G06Q 40/08; G06Q 40/084; G06Q 40/09
See application file for complete search history.

(56) References Cited

U.S. PATENT DOCUMENTS

| | | | |
|---|---|---|---|
| 12,175,464 B2 | 12/2024 | Tai et al. | |
| 2023/0086191 A1 | 3/2023 | Jakobsson | |
| 2023/0177480 A1 | 6/2023 | Spangenberg et al. | |
| 2023/0191264 A1 | 6/2023 | Dalmia et al. | |
| 2023/0253100 A1* | 8/2023 | Caudill | G06N 3/09 |
| | | | 705/3 |
| 2023/0281603 A1* | 9/2023 | Spagni | G06F 21/64 |
| | | | 705/66 |
| 2023/0325814 A1 | 10/2023 | Vijayan et al. | |
| 2023/0419315 A1 | 12/2023 | Togame et al. | |
| 2023/0419327 A1 | 12/2023 | Wu et al. | |
| 2024/0095220 A1 | 3/2024 | Isaacs et al. | |

| | | | |
|---|---|---|---|
| 2024/0112267 A1* | 4/2024 | Harvey | G06Q 40/08 |
| 2024/0177142 A1 | 5/2024 | Ryu et al. | |
| 2024/0394679 A1 | 11/2024 | Lal | |

FOREIGN PATENT DOCUMENTS

| | | | | |
|---|---|---|---|---|
| WO | WO-2020139379 A1 * | 7/2020 | | H04L 9/0637 |
| WO | WO2023102640 A1 | 6/2023 | | |
| WO | WO2023150185 A2 | 8/2023 | | |
| WO | WO2024137146 A1 | 6/2024 | | |

OTHER PUBLICATIONS

Anandhi, et al, "NFT Club—A NFT Marketplace," 2023 9th International Conference on Advanced Computing and Communication Systems (ICACCS), 2023, pp. 157-161.
Behera, et al., "Proposal Of User-Friendly Design Of NFT Marketplace," 2023 4th International Conference on Computing and Communication Systems (I3CS),2023, 6 Pages.
Hasan, et al., "Incorporating Registration, Reputation, and Incentivization Into the NFT Ecosystem," in IEEE Access, vol. 10,2022, pp. 76416-76433.
Kshetri, "Scams, Frauds, and Crimes in the Nonfungible Token Market", vol. 55, No. 4, 2022, pp. 60-64.
Non-Final Office Action for related U.S. Appl. No. 18/387,455, dated Aug. 12, 2025, 38 Pages.

* cited by examiner

*Primary Examiner* — Scott C Anderson
(74) *Attorney, Agent, or Firm* — Lee & Hayes, P.C.

(57) ABSTRACT

Systems and methods for digital asset registration and verification are disclosed. A document representing an intellectual property asset may be requested to be registered with an asset registry. A reference NFT corresponding to the document may be generated and may be registered with a blockchain. A record of the registration may be generated for the asset registry. The registry may be searchable and/or offer functionality such as contractual obligations, insurance provision, and/or verification, among other benefits and functionalities.

15 Claims, 10 Drawing Sheets

100

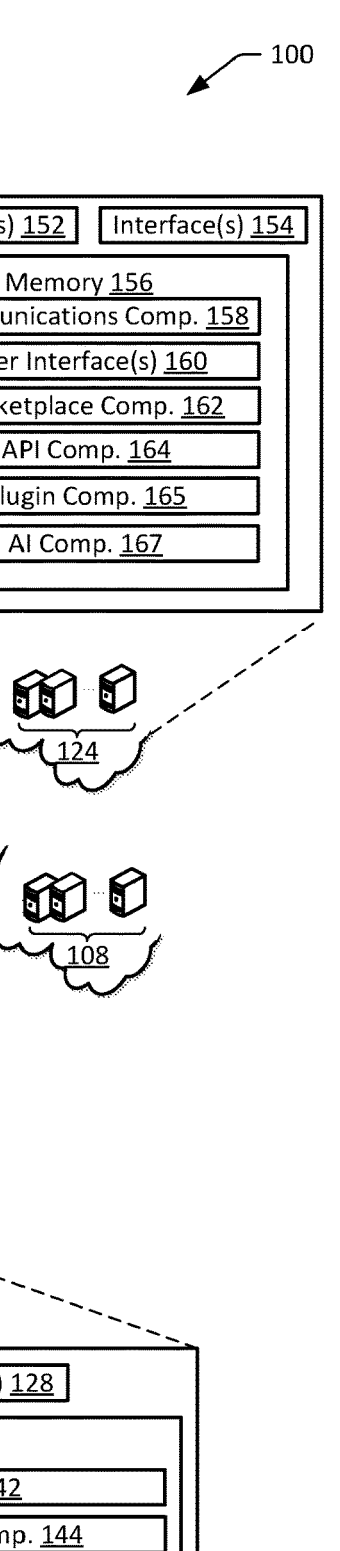

Processor(s) 112    Interface(s) 114

Memory 116
Communications Comp. 118
Firewall 120
User Interface(s) 122

102

Processor(s) 152    Interface(s) 154

Memory 156
Communications Comp. 158
User Interface(s) 160
Marketplace Comp. 162
API Comp. 164
Plugin Comp. 165
AI Comp. 167

124

106    NETWORK 110    108

104

Processor(s) 126    Interface(s) 128

Memory 130

| Communications Comp. 132 | Wizards 142 |
| Reference NFT Generator 134 | Verification Comp. 144 |
| Asset Registry 136 | Linking Comp. 146 |
| Artifact Certification Comp. 138 | Access Database 148 |
| Policy Comp. 140 | Access-Control Comp. 150 |

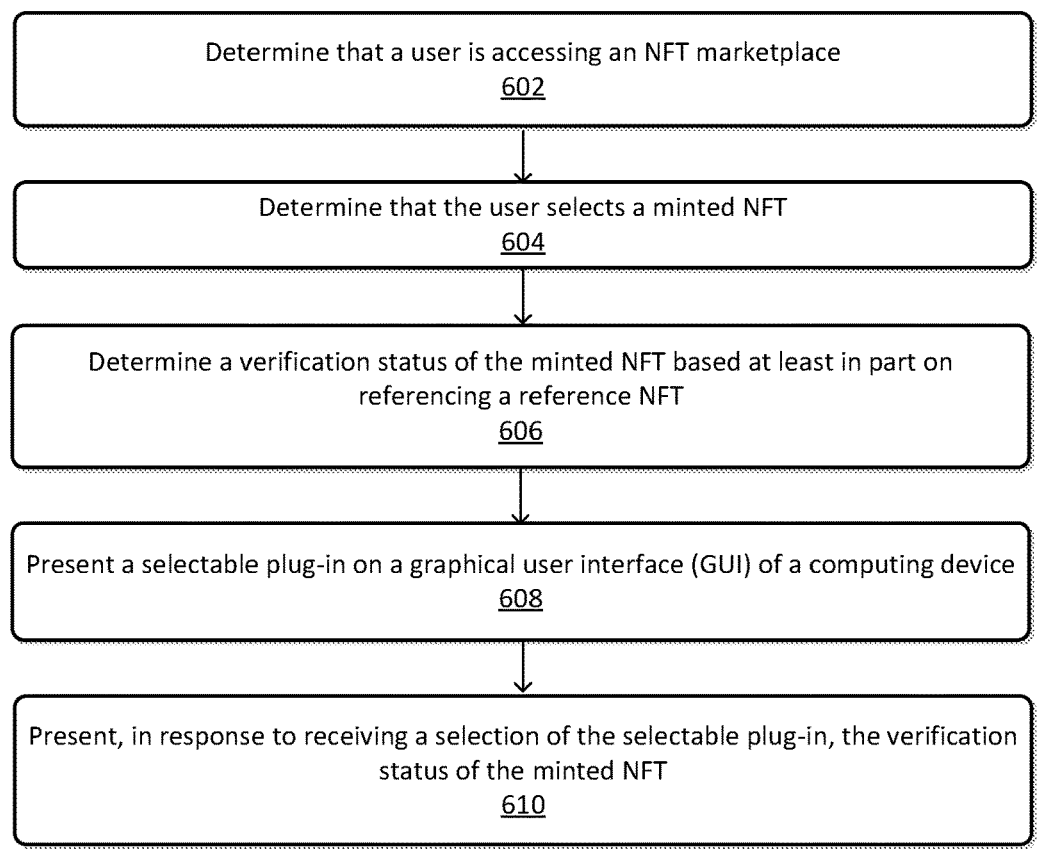

Determine that a user is accessing an NFT marketplace
602

Determine that the user selects a minted NFT
604

Determine a verification status of the minted NFT based at least in part on referencing a reference NFT
606

Present a selectable plug-in on a graphical user interface (GUI) of a computing device
608

Present, in response to receiving a selection of the selectable plug-in, the verification status of the minted NFT
610

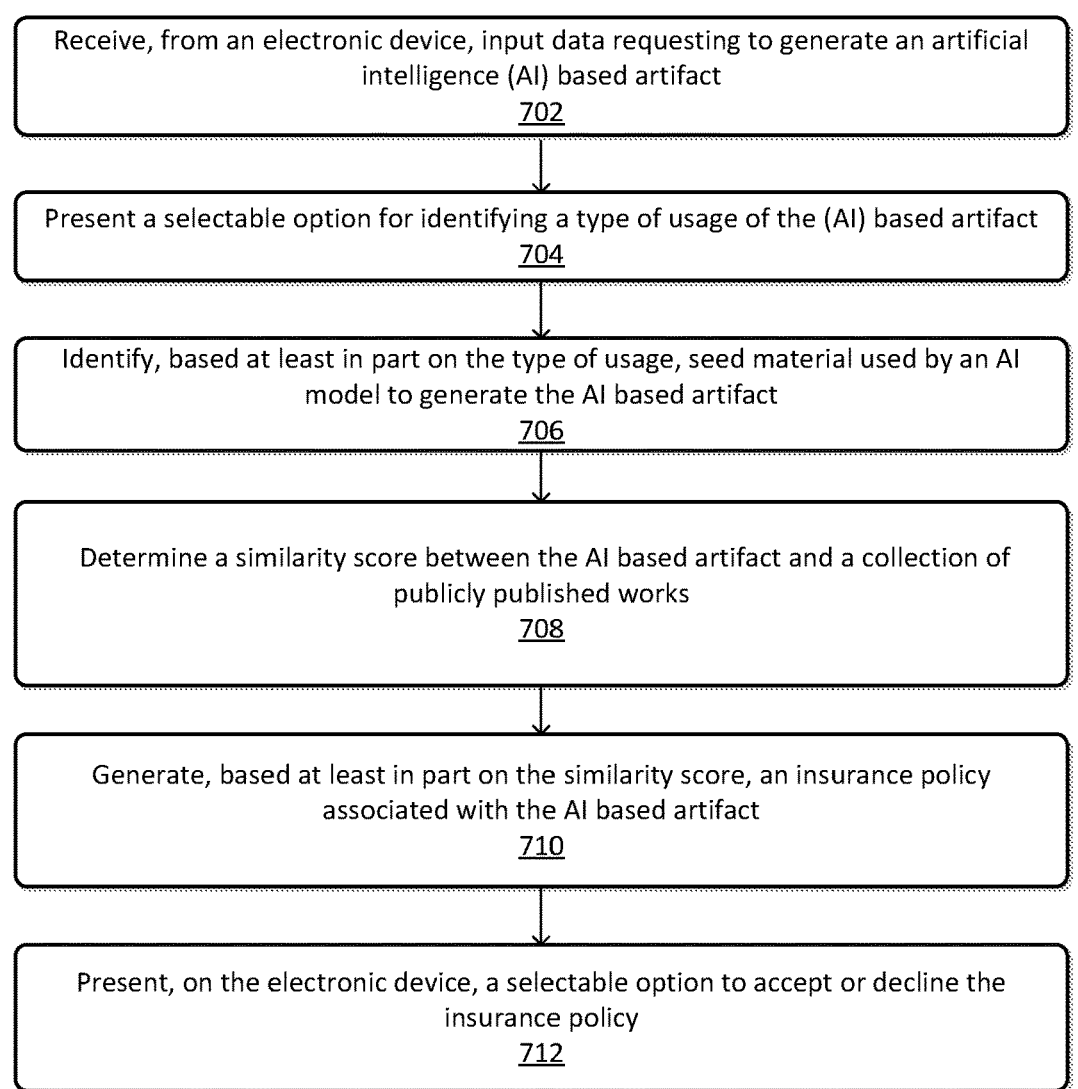

Receive, from an electronic device, input data requesting to generate an artificial intelligence (AI) based artifact
702

Present a selectable option for identifying a type of usage of the (AI) based artifact
704

Identify, based at least in part on the type of usage, seed material used by an AI model to generate the AI based artifact
706

Determine a similarity score between the AI based artifact and a collection of publicly published works
708

Generate, based at least in part on the similarity score, an insurance policy associated with the AI based artifact
710

Present, on the electronic device, a selectable option to accept or decline the insurance policy
712

FIG. 7

800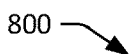

---

Receive, from an electronic device, input data requesting to generate an artificial intelligence (AI) based artifact
802

---

Present a selectable option for identifying a type of usage of the (AI) based artifact
804

---

Identify, based at least in part on the type of usage, seed material used by an AI model to generate the AI based artifact
806

---

Determine a similarity score between the AI based artifact and a collection of publicly published work
808

---

Determine that the AI based artifact is an original work based at least in part on the similarity score
810

---

Receive a block value generated by a distributed-ledger system that is associated with the AI based artifact, the block value representing a block in a blockchain of the distributed-ledger system and a reference non-fungible token (NFT) associated with the artifact
812

---

Maintain a blockchain based system of record storing a proof of authorship that references attributes of the AI based artifact, a date of creation of the AI based artifact, a content address associated with the AI based artifact, author identification associated with the AI based artifact, or an organization associated with the AI based artifact
814

FIG. 8

ARTIFACT REGISTRATION AND VERIFICATION SYSTEM

BACKGROUND

Non-fungible token (NFT) service providers as well as generative artificial intelligence (AI) vendors and marketplaces are at a high degree of risk that a system compromise could lead to unverified transactions and/or fraud, which are largely uninsurable today. NFT's are connected to wallet identifiers (IDs) on a blockchain ledger for which there is not necessarily a "known" party. This enables transactions that can bypass traditional financial controls such as "know your customer" (KYC). Generative AI vendors have adopted a ridged position that their clients are wholly liable for the adoption or use of any system generated output. Conversely mainstream corporations and government agencies are unwilling to adopt such tools due to their opaque nature—as vendors are unwilling to certify the validity of what is generated. Current methods of managing and tracking these transactions often result in frustration and financial loss for many participants involved. Described herein are improvements in technology and solutions to technical problems that can be used to, among other things, assist in the protection of NFT and generative AI transactions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a schematic diagram of an example environment for an artifact registration and verification system.

FIG. 6 illustrates a flow diagram of another example process for artifact verification in accordance with an artifact registration and verification system.

FIG. 7 illustrates a flow diagram of another example process for artifact registration in accordance with an artifact registration and verification system.

FIG. 8 illustrates a flow diagram of another example process for artifact registration in accordance with an artifact registration and verification system.

DETAILED DESCRIPTION

Figure 2:
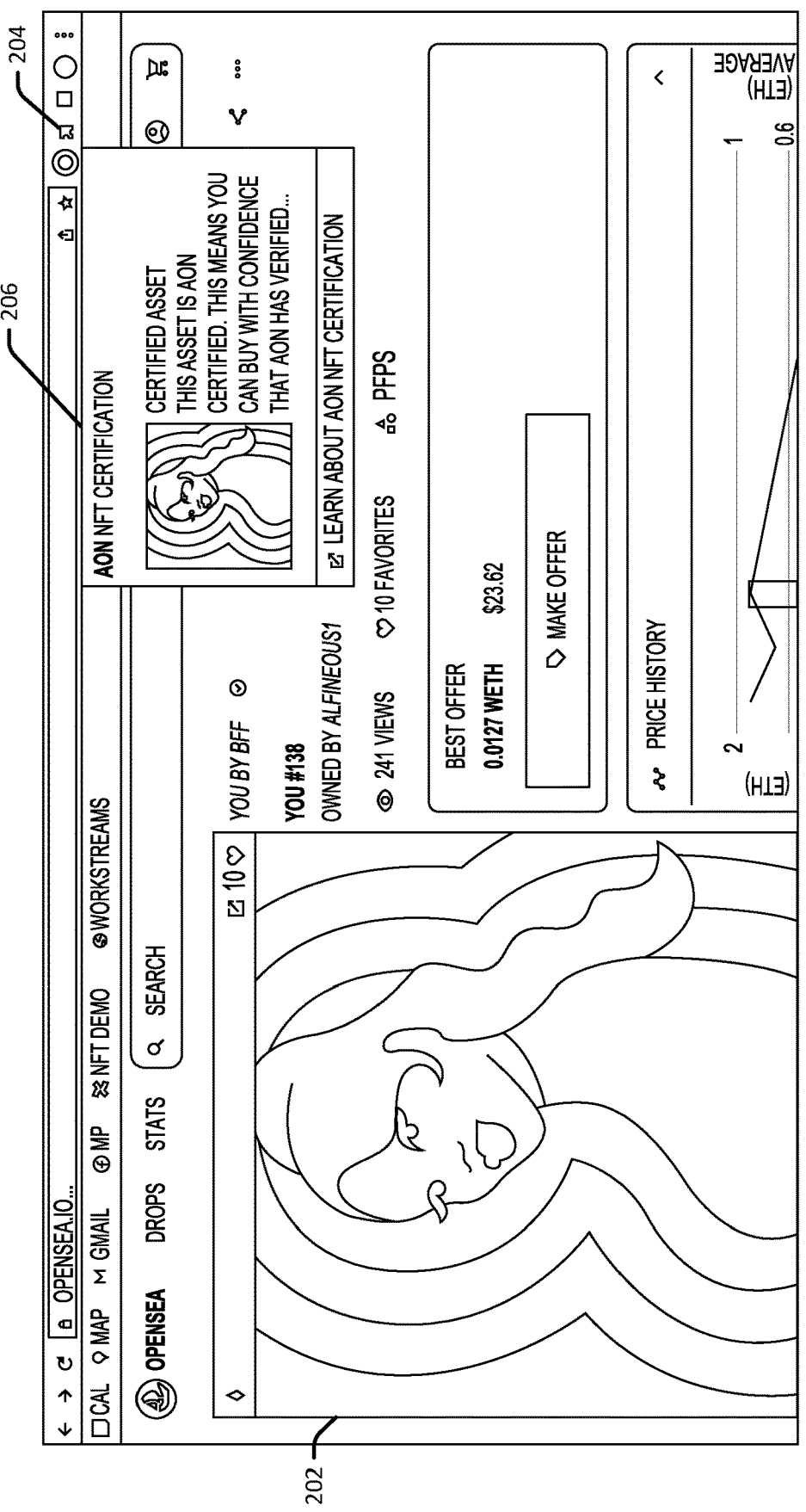
FIG. 2 illustrates an example user interface displaying artifact certification functionality in accordance with an artifact registration and verification system.

Systems and methods for non-fungible token (NFT) registration and verification as well as generative AI artifact certification are disclosed. Take, for example, a company or individual, described herein as an entity, that owns one or more assets. In some cases, a third-party marketplace may offer for sale non-fungible tokens (NFTs) associated with the one or more assets (e.g., artifact) and a purchaser and/or seller of the NFT may desire to verify an authentication of the NFT prior to execution of the transaction. In these and other examples, a system that allows for the registration of such NFT and/or artifacts and associated certificates of ownership in a way that establishes indicia of ownership, credibility of possession, or other information useful in assessing protecting, insuring, or enforcing such property would be beneficial to such entities. In another example, in the creation of a new creative work (e.g., generative AI artifact)—ownership and property rights may be granted to the author but along with that comes the accountability for its creation-should it be an illicit or infringing work. In some cases, when the tool used by generative AI vendor provides an imbalanced influence over the output, questions may arise as to who the accountable party in its generation is. A primary challenge in assigning fault or liability is in the determination of user volition versus a failure of the model output.

The innovations described herein provide a digital property registration and authentication system that, among other things, enables the registration of information, documents and/or other property, provides user interfaces for registration and management of such property, enables verification of registration and/or analysis of potentially misappropriated property, assists in insurance provision, and utilizes data generated by and/or available to the system to increase functionality associated with the registered property. In some cases, services provided by the management system may be facilitated via an application programming interface (API) made available to users of the management system (e.g., purchasers, marketplace operators, creators, etc.). In some examples, services provided by the management system may be facilitated via one or more plugins made available to users of the management system (e.g., purchasers, marketplace operators, creators, etc.). As NFT's are by their very nature distinct, they have a unique token value on the blockchain. The proposed solution is to enable a centralized blacklisting feature—that will enable multiple parties to verify transactions across the NFT ecosystem using one or more plugins, for which statuses may be attached to the unique token identifier.

In some examples, enabling a centralized blacklist by which participating marketplace entities may verify all NFT transfer transactions and marketplace listing nominations against a known list of compromised assets, such assets can be denied listing on major marketplaces and/or investigated. As most marketplaces require some level of customer information, this may encourage investigations of fraudulent activity. By further making the centralized blacklist publicly accessible, any would be purchaser of any NFT, independent of marketplace or service provider, may verify the NFT using a plugin provided by the management system before purchase to ensure that it is not blacklisted. As primary reasons for acquiring NFTs are for expected appreciation of value and the associated "bragging rights" of being the assets owner, any conscientious actor would be sufficiently motivated to pursue a minimum level of diligence prior to purchase of any such asset of significant value.

In some examples, a generative AI vendor may be accountable for ensuring that underlying training data is understood to have been consumed in a lawful manner according to copyright laws and the limitations of fair use. Further, the management system may reasonably represent that any generative work (e.g., AI artifact) is not substantively informed by any given single work, such that it would be deemed a "copy." The generative AI vendor may also represent that the generative work may be claimed and assigned to the users as an original work in the establishment of new intellectual property. In some cases, the management system may anticipate an insurance policy covering end users completing the publishing process to be protected from liability arising from any of the above risks. Conversely, the generative AI vendor and its insuring parties may require limitation of liability in those instances where an illicit or infringing work was deemed to be an act of volition as opposed to a failure of the system. This may require the management system to provide system controls that prevent and document evidence of any such activities that may be adjudicated in a resulting dispute.

For example, a client-side device and/or system, herein described as an electronic device, may include an application that enables a user of the device and/or system to provide input data to the device. The input data may indicate a document, for example, that represents or is used to describe an artifact and/or has been associated with a copyright. The client-side device and/or system may also be provided data associated with the artifact, such as, but not limited to, metadata associated with at least one of the copyright or the artifact (e.g., a filing date of the copyright, an assignee of the copyright, an age of the copyright, etc.), a digital representation of the artifact (e.g., an image file, an audio file, a video file, etc.), a valuation the copyright, a valuation of the artifact, or a copyright registration number. In some cases, the input data may indicate a contractual right to an asset. For example, a contract (e.g., a smart contract) may assign a right to an entity (e.g., a holder) associated with an NFT associated with the asset. In this case, the entity may desire to register the contract with the registry system as discussed herein. In some cases, the input data may include a prompt interaction for generating an AI artifact via a generative AI vendor. For example, the prompt may include a description of the subject that the user would like to create. This may include anything from a person, animal, or object to an abstract concept or emotion. In some cases, the input data may include the seed material used to generate the AI artifact. For example, after the AI vendor receives the user prompts and generates the AI artifact, the management system may receive (e.g., from the AI vendor and/or the client-side device) the seed material used by the AI vendor to generate the AI artifact.

In some examples, once the management system receives the seed material used by the AI vendor to generate the artifact, the management system may screen a generated output against the original training corpus of artifacts, to identify the most "like" known artifacts. For example, the management system may generate a similarity score (e.g., via generated vector representations of the AI artifact and the seed material items) between the AI artifact and each of the seed material items used to generate the AI artifact as well as a collection of publicly published works that may be accessed by a common crawl library. In some cases, in response to the similarity score being above a threshold value (e.g., above 50%), the management system may present the items to the user for acknowledgement that the items are or are not observably like works. In some cases, the generated AI artifact may be screened against all artifacts associated with the management system that were previously generated by which to prevent collisions where a like previous work was assigned ownership to another party as a result of similar prompt input previously generated.

Once the generated AI artifact has been screened and the management system determines that the AI artifact is authentic (e.g., would not be deemed a "copy" of any of the seed material and/or another AI artifact), the management system may generate certification data that indicates a certification of the generated AI artifact. For instance, the management system may generate certification data that includes metadata associated with the AI artifact (e.g., author information, date of generation information, AI vendor information, prompt information, etc.), an attestation of originality, and/or a prompt capture.

In some cases, the client-side device and/or management system may send, to a registry system, the input data, the certification data, and, in examples, request data indicating a request to register, in association with an asset registry, a certificate of ownership associated with the copyright and/or the artifact (e.g., the NFT and/or the AI artifact). The registry system may receive the input data, the certification data, and/or the request data and may initiate a process of generating a certificate of ownership (e.g., a reference NFT) associated with the copyright and/or the artifact and registering the certificate of ownership in association with the asset registry. For example, the registry system may send the input data, the certification data, and/or request data to a blockchain system managing one or more blockchains. The request data may indicate a request to register the certificate of ownership and/or identifying information associated with the certificate of ownership with the blockchain. The blockchain system may register the certificate of ownership and/or the other information described herein in association with a block of the blockchain. A cryptographic certificate of ownership value may be generated by the registry system that may represent the block in the blockchain. Additionally, or alternatively, a time value may be determined that indicates a time and/or day at which the certificate of ownership and/or the other information described herein was registered with the blockchain. The blockchain system may then send the cryptographic certificate of ownership value to the registry system associated with the asset registry. The blockchain system may additionally, or alternatively, send the cryptographic certificate of ownership value to the client-side device, particularly in instances where the request data to register the certificate of ownerships was received from the client-side device. In some examples, the cryptographic certificate of ownership value may be referred to as a "reference token," which may act as the point of inception for traceability. The reference token may establish the ongoing verification mechanism that would enable the flagging of events which involve compromised assets or transfer to a secondary blacklist for "known bad" wallets.

The registry system may generate a record in the asset registry. The record may include information associated with the reference token (e.g., the copyright, the artifact, the certificate of ownership associated with the copyright, and/or the certificate of ownership associated the artifact). For example, the record may include data indicating an identifier of the record, a naming indicator associated with the artifact, a description of the artifact, a naming indicator associated with the document, one or more tags associated with the artifact, a status indicator for the artifact, the certificate of ownership, a block number associated with the block of the blockchain that the certificate of ownership is registered with, the cryptographic certificate of ownership value, the time value, and/or one or more other types of data associated with the artifact and/or registration of the artifact, such as valuation, insurance policy information, versioning information, etc. The registry system, in examples, may generate confirmation data indicating that the record has been generated, and the confirmation data may be sent to the client-side device and/or system for display, e.g., via a user interface, or otherwise made available for programmatic consumption by an outside system.

In some examples, the reference token may be associated with one or more contractual obligations that may be designated and/or otherwise agreed to by the entity registering the artifact. For example, contractual obligations may include assignment of rights of a copyright associated with the artifact, an attestation to accept legal liability, or an attestation to accept financial liability. In this way, the registry system may act as a central authority and/or a registry of rights and encumbrances established for NFTs and/or AI artifacts in which participants (e.g., third-party marketplaces selling NFTs and/or AI artifacts, minting NFTs, purchasing NFTs and/or AI artifacts, purchasers of NFTs and/or AI artifacts, sellers of NFTs and/or AI artifacts, etc.) can reflect on registry status (e.g., contractual obligations) and impart governance rules on what are otherwise decentralized autonomous tokens.

In some examples, the registry system may receive an indication that one or more minted NFTs associated with the artifact and/or a copyright has been involved in an adverse event and/or an illegitimate transaction and be flagged. For example, the entity that created the artifact and/or is associated (e.g., assigned) with the copyright of the artifact may offer for sale a number of NFTs associated with the copyright and/or artifact on a third-party marketplace. In cases where a purchaser of the NFT has the NFT stolen (e.g., stolen from their blockchain wallet) after legitimately purchasing the NFT from the marketplace, the purchaser may file an insurance claim with the registry system to recoup the loss of value. In some examples, receiving the insurance claim may indicate to the registry system that the minted NFT is no longer being held (e.g., stored in a blockchain wallet) by a legitimate entity and that the minted NFT should be flagged and/or added to an asset blacklist. In other examples, an entity may inform the registry system that the minted NFT is no longer being held (e.g., stored in a blockchain wallet) by a legitimate entity and that the minted NFT should be flagged and/or added to an asset blacklist without having to file for an insurance claim. For example, the entity and/or the insurance claim may include identifying information associated with the artifact associated with the minted NFT. The registry system may then check the asset registry to determine if a reference token is stored for the artifact and what, if any, contractual obligations (e.g., insurance policies) may be associated with the artifact and/or reference token.

In some examples, the registry system may receive a request to verify that a document is registered with respect to the asset registry. For example, the entity that created the artifact and/or is associated (e.g., assigned) with the copyright of the artifact may offer for sale a number of NFTs associated with the copyright and/or artifact on a third-party marketplace. In some cases, the third-party marketplace and/or a purchaser patronizing the third-party marketplace may send a request to the registry system that a particular NFT associated with a copyright and/or artifact is authentic and/or is otherwise legitimate. In this case, the third-party marketplace may display a plugin for the purchaser to select while accessing an interface (e.g., a webpage) presented to the purchaser. Selection of the plugin may automatically send identifying data associated with the NFT to be purchased (e.g., block value information, information associated with the artifact, information associated with the copyright, a copyright registration number, a certificate of ownership registration number, etc.) to the registry system. Once the registry system receives the identifying information and the request to verify the NFT to be purchased, the registry system may query the asset blacklist to determine that the NFT to be purchased has not been involved in an adverse event and/or an illegitimate transaction (e.g., stolen). The registry system may send an indication to the third-party marketplace and/or a purchaser indicating a verification of the legitimacy of the NFT to be purchased.

In some examples, the registry system may receive a request to generate an insurance policy associated with the artifact, a copyright associated with the artifact, the reference NFT and/or minted NFTs associated with the artifact. The term "artifact," as used herein, may be in reference to the artifact associated with the NFT or the generated AI artifact discussed herein. For example, the registry system may be configured to assist in the application, underwriting, and provision of one or more insurance policies for a given artifact, a copyright associated with the artifact, the reference NFT and/or minted NFTs associated with the artifact. For example, once registered with the asset registry, an option may be presented to gain insurance coverage on the artifact, a copyright associated with the artifact, the reference NFT and/or minted NFTs associated with the artifact. For example, a selectable portion of a user interface on the client-side device/system may provide the option to apply for an insurance policy. When selected, the user interface may display one or more dialog boxes and/or input fields configured to receive user input regarding application for an insurance policy. This information may include, for example, information relating to the applicant, an artifact type or category, a value of the artifact (either determined from above or identified by the user), a desired policy period, desired policy limits and retention, an entity value, a date of creation of the artifact, and/or a portion enabling uploading of supporting and/or requested documentation. In examples where supporting documentation is provided, the supporting documentation may be registered with the blockchain in the same or a similar manner as described above with respect to the supporting document for artifact valuation.

In some examples, the registry system may receive a request to generate an insurance claim associated with the artifact, a copyright associated with the artifact, the reference NFT and/or minted NFTs associated with the artifact. For example, the registry system may cause a user interface to display, via the client-side device/system, dialog boxes and/or input fields including text associated with submitting a claim for insurance coverage in association with an insurance policy for the artifact, a copyright associated with the artifact, the reference NFT and/or minted NFTs associated with the artifact. In these examples, given that an allegation of artifact, a copyright associated with the artifact, the reference NFT and/or minted NFTs associated with the artifact misappropriation, or other legal claim, may exist, one or more wizards may be initiated to assist in filing a claim for insurance coverage. Input data may be received representing responses to the dialog boxes, and based at least in part on receiving the input data, the input data may be formatted and/or sent to a remote system associated with an insurer indicating that a claim is to be filed and/or notifying the insurer of the potential misappropriation and/or other legal action.

In examples, the functionality described herein may be provided, at least in part, via a user interface. The user interface may include one or more selectable portions that, when selected, may cause one or more processors to perform the operations described herein. For example, the user interface may include selectable portions indicating an option to register the artifact, a copyright associated with the artifact, the reference NFT and/or minted NFTs associated with the artifact in association with the asset registry, enabling a user to select and/or identify a document corresponding to the artifact, a copyright associated with the artifact, the reference NFT and/or minted NFTs associated with the artifact, enabling a user to view a record of the asset registry, enabling a user to acquire and/or view information associated with an insurance policy on the artifact, a copyright associated with the artifact, the reference NFT and/or minted NFTs associated with the artifact, enabling a user to acquire and/or view information associated with an insurance policy on the artifact, a copyright associated with the artifact, the reference NFT and/or minted NFTs associated with the artifact, enabling valuation of the artifact, a copyright associated with the artifact, the reference NFT and/or minted NFTs associated with the artifact, enabling input of text for tag data generation, enabling searching capabilities of records associated with the asset registry and/or records associated with the entity, enabling verification that a document is registered with respect to the asset registry, and/or displaying links and/or associations between records.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example architecture 100 for digital property registration and verification. The architecture 100 may include, for example, one or more client-side devices, also described herein as electronic devices 102, that allow clients to register and manage their artifacts (e.g., creative works, AI artifacts, etc.) a copyright associated with the artifact, a reference NFT associated with the artifact and/or minted NFTs associated with the artifact and/or other intangible or digital assets. In some examples, the electronic devices 102 may be associated with a creator of an artifact desiring to register the artifact and generate a reference NFT associated with the artifact (e.g., a certificate of ownership) to be stored by an asset registry system. The architecture 100 includes an asset registry system 104 associated with an asset registry that is remote from, but in communication with, the client-side electronic devices. The architecture 100 further includes a distributed ledger system 106 that is remote from, but in communication with, the client-side devices 102 and the registry system 104. The distributed ledger system 106 utilizes blockchain technology to accept entries in a secure, verifiable manner, such as document obfuscation values associated with the artifacts, a copyright associated with the artifact, a reference NFT associated with the artifact and/or minted NFTs associated with the artifact being registered by the asset registry. The architecture 100 also has an insurer system 108, which may also be described herein as a third remote system associated with an insurer. The insurer system 108 may utilize information from the registry system 104 and/or the distributed-ledger system 106 to, for example, issue insurance policies associated with the artifacts, a copyright associated with the artifact, a reference NFT associated with the artifact and/or minted NFTs associated with the artifact, and/or other digital assets being registered by the asset registry. The architecture 100 also has a third-party marketplace system 124 that is remote from, but in communication with, the client-side devices 102 and the registry system 104. The third-party marketplace system 124 may be used to perform generation of artifacts (e.g., AI artifacts) and transactions involving artifacts, copyrights associated with artifacts, and/or minted NFTs associated with artifacts. In some cases, the third-party marketplace system 124 may desire to verify a minted NFT that is involved in a transaction via the registry system 104. Some or all of the devices and systems may be configured to communicate with each other via a network 110.

The electronic devices 102 may include components such as, for example, one or more processors 112, one or more network interfaces 114, and/or memory 116. The memory 116 may include components such as, for example, a communications component 118, a firewall 120, and/or one or more user interfaces 122. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative, and should not be considered the exclusive example of the components of the electronic device 102.

By way of example, the user interface(s) 122 may include a selectable portion that, when selected, may enable identification of a document representing an artifact, a copyright associated with the artifact, and/or a reference NFT associated with the artifact. For example, the selectable portion and/or another portion of the user interface 122 may include text requesting that a user of the user interface 122 select the selectable portion to identify a document including information to be registered as an artifact, a copyright associated with the artifact, and/or a reference NFT associated with the artifact in association with the asset registry. The user may provide input to the electronic device 102 indicating the information and/or document to be registered as an artifact, a copyright associated with the artifact, and/or a certificate of ownership associated with the copyright. The input may include selection of a naming indicator for the document.

The communications component 118 may be configured to enable communications between the electronic device 102 and the other components of the architecture 100, such as the registry system 104, the distributed-ledger system 106, the insurer system 108, and/or the third-party marketplace system 124. The communications component 118 may further generate data to be communicated and/or may format already-generated data for transfer to one or more of the remote systems. The communications component 118 may also be configured to receive data from one or more of the remote systems.

The firewall 120 may be configured to receive data from the communications component 118 and/or from one or more other components of the electronic device 102. The firewall 120 may be described as a network security system that may monitor and/or control incoming and outgoing data based on security rules. The security rules may indicate that the electronic device 102 is configured to send certain data to the registry system 104, and/or the distributed-ledger system 106, the insurer system 108, and/or the third-party marketplace system 124. The security rules may also indicate that the electronic device 102 is configured to receive certain data from the registry system 104, the distributed-ledger system 106, the insurer system 108, and/or the third-party marketplace system 124. The firewall 120 may be utilized to control the distribution of sensitive information, particularly when the architecture 100 is being utilized to register confidential documents with the asset registry.

The registry system 104 may include components such as, for example, one or more processors 126, one or more network interfaces 128, and memory 130. The memory 130 may include components such as, for example, a communications component 132, a reference NFT generator 134, an asset registry 136, an artifact certification component 138, a policy component 140, one or more wizards 142, a verification component 144, a linking component 146, an access database 148, and/or an access-control component 150. The components of the registry system 104 will be described below by way of continued example. It should be understood that the example provided herein is illustrative, and should not be considered the exclusive example of the components of the registry system 104. It should be understood that when a system and/or device is described herein as a "remote system" and/or a "remote device," the system and/or device may be situated in a location that differs from, for example, the electronic device 102.

The communications component 132 may be configured to enable communications between the registry system 104 and the other components of the architecture 100, such as the electronic device 102, the distributed-ledger system 106, the insurer system 108, and/or the third-party marketplace system 124. The communications component 132 may further generate data to be communicated and/or may format already-generated data for transfer to other components of the architecture 100. The communications component 132 may also be configured to receive data from one or more of the other remote systems and/or the electronic device 102.

The reference NFT generator 134 of the registry system 104 may generate a reference NFT associated with an artifact and/or a copyright of an artifact. For example, the registry system 104 may receive (e.g., via the electronic device 102) input data and/or certification data indicating a document, that represents or is used to describe an artifact and/or has been associated with a copyright. The registry system 104 may also receive data associated with the artifact, such as, but not limited to, metadata associated with at least one of the copyright or the artifact (e.g., a filing date of the copyright, an assignee of the copyright, an age of the copyright, a generation date of the artifact, an author of the artifact, a prompt associated with the artifact, etc.), a digital representation of the artifact (e.g., an image file, an audio file, a video file, etc.), a valuation the copyright, a valuation of the artifact, an attestation of originality associated with the artifact, a prompt capture associated with the artifact, and/or a copyright registration number. In some examples, a reference NFT associated with an artifact and/or a copyright may represent a right to access or otherwise utilize an artifact that is associated with the copyright as well as represent a certification that the artifact is in fact an original work (e.g., is not deemed a "copy" or is duplicative of a seed material item and/or another artifact). The entity who is associated with the artifact and/or the copyright (e.g., owns the copyright) may desire to have a reference NFT generated in order to establish a record of ownership as well as contractual obligations that may be associated with the artifact and/or the reference NFT. The registry system 104 may receive the input data and, in examples, request data indicating a request to register, in association with an asset registry, a reference NFT associated with the copyright and/or the artifact. The registry system 104 may receive the input data and/or the request data and may initiate a process of generating a reference NFT associated with the artifact and/or the copyright and registering the reference NFT in association with the asset registry 136. For example, the communications component 132 may be configured to generate request data indicating a request to register an artifact, a copyright, and/or a reference NFT associated with the artifact and/or the copyright in association with a blockchain, such as a blockchain associated with the distributed-ledger system 106. The request data may be sent to the distributed-ledger system 106 along with, for example, an identifier of the document and/or the artifact, the certification data, the copyright, and/or the reference NFT associated with the artifact and/or the copyright, and/or other information associated with the document and/or the artifact, the copyright, and/or the reference NFT associated with the artifact and/or the copyright. The distributed-ledger system 106 may receive the request data and the identifier (or other data) and may register the identifier (e.g., of the artifact, the certification data, the copyright, and/or the reference NFT associated with the artifact and/or the copyright) (or the other data) in association with a block of the blockchain. The distributed-ledger system 106 may generate a cryptographic reference NFT value representing the block in the blockchain and/or the distributed-ledger system 106 may generate a time value indicating a time and/or day that the identifier (or the other data) was registered with the blockchain. The distributed-ledger system 106 may send the cryptographic reference NFT value, the time value, and/or other information (such as a block number, vector representation of the artifact, content address, Interplanetary File System (IPFS) storage data, etc.) to the registry system 104 and/or the electronic device 102.

As used herein, a blockchain is a list and/or ledger of records, also described as blocks, that are linked using cryptography. A block in the blockchain contains a cryptographic hash of the previous block, a time value or timestamp, and, in examples, transaction data. The blockchain may be utilized to record transactions between two entities and/or systems. In these examples, the blockchain may be utilized to record the transaction of registering an artifact, a copyright, and/or a reference NFT associated with the artifact and/or the copyright in an asset registry between the electronic device 102 and the registry system 104. As described in more detail elsewhere herein, the blockchain may also be utilized to register valuation documentation, insurance policy documents, and/or other information associated with the asset registry. The blockchain may be managed by a peer-to-peer network collectively adhering to a protocol for inter-node communication and validating new blocks. Once recorded in a block, the data cannot be altered without alteration of all subsequent blocks, which would require a majority of the network to agree upon.

In examples, multiple blockchain systems may be utilized to register the transaction between the registry system 104 and the electronic device 102. For example, the artifact, the copyright, and/or the reference NFT associated with the artifact and/or the copyright may be sent to multiple blockchain systems, and each blockchain system may return a cryptographic document obfuscation value corresponding to a block in their respective blockchains. As described more fully below; the record indicating registration of the artifact, the copyright, and/or the reference NFT associated with the artifact and/or the copyright with the asset registry 136 may include the multiple cryptographic document obfuscation values and/or other information associated with registration of blocks in the multiple blockchains.

In some examples, the reference NFT may be associated with one or more contractual obligations that may be designated and/or otherwise agreed to by the entity registering the artifact. For example, contractual obligations may include assignment of rights of a copyright associated with the artifact, an attestation to accept legal liability, or an attestation to accept financial liability. In this way, the registry system 104 may act as a central authority and/or a registry of rights and encumbrances established for NFTs in which participants (e.g., third-party marketplaces selling NFTs, minting NFTs, purchasing NFTs, purchasers of NFTs, sellers of NFTs, etc.) can reflect on registry status (e.g., contractual obligations) and impart governance rules on what are otherwise decentralized autonomous tokens.

The asset registry 136 may store information associated with an artifact, a copyright, and/or a reference NFT associated with the artifact and/or the copyright. For example, the information may include an identifier of the reference NFT associated with the artifact and/or the copyright, a naming indicator for the artifact and/or copyright, a description of the artifact, one or more tags, a status identifier for the record and/or the reference NFT associated with the artifact and/or the copyright, the cryptographic reference NFT value, the block number, the time value (also described as the block timestamp), insurance policy details, valuation details, smart contract data associated with the copyright and/or the reference NFT associated with the artifact and/or the copyright, proof of authorship associated with the artifact, and/or other information associated with the artifact and/or copyright. The information may be stored along with one or more other records in the asset registry 136. The registry system 104, in examples, may generate confirmation data indicating that a record of the information has been generated, and the confirmation data, along with the record itself, may be sent to the electronic device 102 for display via a user interface 122. In examples, auditing of access and/or edit history associated with records may be performed such that if a user interacts with the record, data indicating interaction of that user with the information associated with the record may be surfaced and/or reported. In addition, audit logs and/or data may be registered to the distributed-ledger to verify when auditing was performed.

In some examples, the asset registry 136 may receive an indication that one or more minted NFTs associated with an artifact and/or a copyright has been involved in an adverse event and/or an illegitimate transaction and be flagged (e.g., NFTs minted by the third-party marketplace 124). For example, the entity that created the artifact and/or is associated (e.g., assigned) with the copyright of the artifact may offer for sale a number of NFTs associated with the copyright and/or artifact on the third-party marketplace 124. In cases where a purchaser of the NFT has the NFT stolen (e.g., stolen from their blockchain wallet) after legitimately purchasing the NFT from the third-party marketplace 124, the purchaser may file an insurance claim with the registry system 104 to recoup the loss of value. In some examples, receiving the insurance claim may indicate to the registry system 104 that the minted NFT is no longer being held (e.g., stored in a blockchain wallet) by a legitimate entity and that the minted NFT should be flagged and/or added to an asset blacklist stored by the asset registry 136. In other examples, an entity may inform the registry system 104 that the minted NFT is no longer being held (e.g., stored in a blockchain wallet) by a legitimate entity and that the minted NFT should be flagged and/or added to the asset blacklist stored by the asset registry 136 without having to file for an insurance claim. For example, the entity and/or the insurance claim may include identifying information associated with the artifact associated with the minted NFT. The registry system 104 may access the asset registry 136 to determine if a reference NFT is stored for the artifact and what, if any, contractual obligations (e.g., insurance policies) may be associated with the artifact and/or reference NFT.

In examples, the asset registry 136 may be searchable. For example, an interface may be generated and configured to allow access to at least a portion of the asset registry 136 via the electronic device 102, the third-party marketplace system 124, and/or a remote docketing system associated with other intellectual property assets. Access information, as described more fully herein with respect to the access-control component 150, may be sent for accessing the interface. The registry system 104 may receive, such as from the electronic device 102, the third-party marketplace system 124, and/or a remote docketing system, a request to perform a search of the asset registry 136. In these examples, the request may include text data to be utilized to search the asset registry 136. The text data may be utilized to identify results of the search and results data representing the results may be sent to the remote docketing system and/or the electronic device 102.

The artifact certification component 138 may be configured to assist in certification of a generated artifact, such as an AI artifact, and generate a proof of authorship of the artifact with respect to a user. For example, the artifact certification component 138 may receive input data that may include a prompt interaction for generating an AI artifact via the third-party marketplace system 124, which in this case may include a generative AI vendor. In some cases, the prompt may include a description of the subject that the user would like to create. This may include anything from a person, animal, or object to an abstract concept or emotion. In some cases, the input data may include the seed material used to generate the AI artifact. For example, after the AI vendor receives the user prompts and generates the AI artifact, the artifact certification component 138 may receive (e.g., from the AI vendor and/or the client-side device) the seed material used by the AI vendor to generate the AI artifact.

In some examples, once the artifact certification component 138 receives the seed material used by the AI vendor to generate the artifact, the artifact certification component 138 may screen a generated output against the original training corpus of artifacts, to identify the most "like" known artifacts. For example, the artifact certification component 138 may generate a similarity score (e.g., via generated vector representations of the AI artifact and the seed material items) between the AI artifact and each of the seed material items used to generate the AI artifact as well as a collection of publicly published works that may be accessed by a common crawl library. In some cases, in response to the similarity score being above a threshold value (e.g., above 50%), the artifact certification component 138 may present the seed material items to the user for acknowledgement that the seed material items are or are not observably like works. In some cases, the generated AI artifact may be screened against all artifacts associated with the artifact certification component 138 that were previously generated by which to prevent collisions where a like previous work was assigned ownership to another party as a result of similar prompt input previously generated.

Once the generated AI artifact has been screened and the artifact certification component 138 determines that the AI artifact is authentic (e.g., would not be deemed a "copy" of any of the seed material and/or another AI artifact), the artifact certification component 138 may generate certification data that indicates a certification of the generated AI artifact. For instance, the artifact certification component 138 may generate certification data that includes metadata associated with the AI artifact (e.g., author information, date of generation information, AI vendor information, prompt information, etc.), and attestation of originality, and/or a prompt capture.

The policy component 140 may be configured to assist in the application, underwriting, and provision of one or more insurance policies for a given artifact (e.g., generated AI artifact), copyright, reference NFT associated with a copyright and/or artifact, and/or minted NFT associated with an artifact and/or copyright. For example, once registered with the asset registry 136, an option may be presented to gain insurance coverage on the artifact, copyright, reference NFT associated with a copyright and/or artifact, and/or minted NFT associated with an artifact and/or copyright. For example, a selectable portion of the user interface 122 may provide the option to apply for an insurance policy. When selected, the user interface 122 may display one or more dialog boxes and/or input fields configured to receive user input regarding application for an insurance policy. This information may include, for example, information relating to the applicant, the artifact, a copyright and/or reference NFT associated with a copyright type or category, a value of the copyright and/or reference NFT associated with a copyright (either determined from above or identified by the user), a desired policy period, desired policy limits and retention, an entity value, a date of creation of the copyright and/or reference NFT associated with a copyright and/or artifact, and/or a portion enabling uploading of supporting and/or requested documentation. In examples where supporting documentation is provided, the supporting documentation may be registered with the blockchain in the same or a similar manner as described above with respect to the supporting document for artifact valuation.

The policy component 140, and/or the communications component 132, may be configured to receive input data corresponding to the user input and may send the input data to the insurer system 108, which is associated with an insurer. The insurer system 108 may process the input data and, in examples, underwrite and/or issue a policy insuring the artifact, copyright, reference NFT associated with a copyright and/or artifact, and/or minted NFT associated with an artifact and/or copyright from, for example, misappropriation. In these examples, confirmation data indicating that the policy has been issued and information associated with the policy may be received from the insurer system 108. This information may be incorporated into the record associated with the artifact, copyright, reference NFT associated with a copyright and/or artifact, and/or minted NFT associated with an artifact and/or copyright and may be displayed via the user interface 122, in examples. Some nonlimiting examples of information associated with the insurance policy may include a policy type, a limit of liability, a retention value, a policy premium, a policy form, a policy number, a policy period, a sub-limit of liability, and/or a valuation of the artifact, copyright, reference NFT associated with a copyright and/or artifact, and/or minted NFT associated with an artifact and/or copyright. Additionally, or alternatively, the information may include a payout value or values associated with amounts of money to be paid to the entity associated with the artifact, copyright, reference NFT associated with a copyright and/or artifact, and/or minted NFT associated with an artifact and/or copyright upon the occurrence of different classes of events including different levels of unauthorized access or use. In these examples, the policy component 140 may receive noncompliance data indicating that the entity has not complied with a condition of the insurance policy and may cause display of updated insurance-policy information including an indicating that curative action is required and/or an updated payout value. In these examples, the updated payout value may be less than the original payout value. As the condition is met, the payout value may be updated to reflect compliance with the condition of the insurance policy.

In some examples, the policy component 140 may determine a payout value based on if an asset is determined to be infringing and results in damages to the acquiring party. For example, the policy component 140 may determine if an insurance claim is valid on the basis of the insureds volition. Volition may be determined on apparent intentionality of the prompt language (e.g., seed material used to create the AI artifact), including but not limited to reference to a trademark or commercial likeness of a copyright work, including actual seed image references: or a failure to identify in the publishing review step that a like/copyright work of substantial similarity is already in existence.

In examples, one or more smart contracts may be utilized in association with the policy component 140. For example, the insurance policy may be associated with a given artifact, copyright, reference NFT associated with a copyright and/or artifact, and/or minted NFT associated with an artifact and/or copyright using a smart contract associated with the blockchain. A smart contract, as described herein, may be a computer protocol to digitally facilitate, verify, and/or enforce the negotiation and/or performance of a contract. Transactions involving smart contracts may be trackable and irreversible. The smart contracts may utilize, for example, Byzantine fault tolerant algorithms that may allow digital security through decentralization of the contract. The smart contracts may be initiated, hosted, and/or implemented, at least in part, by the distributed-ledger system 106 associated with the blockchain. In these examples, the smart contract may indicate a condition for validating an insurance policy, such as management's continued investment in threshold level of digital and/or physical security, and validation data may be received that indicates the condition has been met. In these examples, the validation data may be sent to the distributed-ledger system 106, which may cause the smart contract to validate the insurance policy.

The wizards 142 as described herein may be a set of dialog boxes and/or input fields configured to be displayed, such as via the electronic device 102. For example, a wizard 142 may be utilized to receive user input for artifact registration, verification, determination, and/or support. Additionally, or alternatively, a wizard 142 may be utilized to receive user input for insurance policy application, underwriting, and provision. In examples where a wizard 142 is utilized for insurance policy provision, the wizard 142 and/or information associated with the wizard 142 may be provided by and/or may be specific to a given insurer. Additionally, or alternatively, a wizard 142 may be utilized to submit a notice of a potential misappropriation event and/or an insurance claim, as described more fully herein.

The verification component 144 may be configured to verify that information included in a particular document has been registered with the asset registry 136. For example, once registered, the verification component 144 may be utilized to determine if and/or verify that other information, such as an artifact, copyright, reference NFT associated with a copyright and/or artifact, and/or minted NFT associated with an artifact and/or copyright involved in a transaction, matches or is similar to the information included in the registered document. In these examples, the artifact, copyright, reference NFT associated with a copyright and/or artifact, and/or minted NFT associated with an artifact and/or copyright involved in the transaction may be identified, such as via a user interface 122 of the electronic device 102 and/or the third-party marketplace system 124, as part of a verification request. The verification component 144 may be utilized to analyze the artifact, copyright, reference NFT associated with a copyright and/or artifact, and/or minted NFT associated with an artifact and/or copyright involved in the transaction with respect to the registered reference NFT, and/or other information (e.g., cryptographic reference NFT values) stored in the asset registry 136. If the verification component 144 determines that at least one of the registered documents matches the artifact, copyright, reference NFT associated with a copyright and/or artifact, and/or minted NFT associated with an artifact and/or copyright, the verification component 144 may determine that the artifact, copyright, reference NFT associated with a copyright and/or artifact, and/or minted NFT associated with an artifact and/or copyright involved in the transaction is the same or otherwise associated with the registered document or documents stored in the asset registry 136.

In some examples, the registry system 104 may receive a request to verify that a document and/or NFT is registered with respect to the asset registry 136. For example, the entity that created the artifact and/or is associated (e.g., assigned) with the copyright of the artifact may offer for sale a number of NFTs associated with the copyright and/or artifact on the third-party marketplace system 124. In some cases, the third-party marketplace system 124 and/or a purchaser patronizing the third-party marketplace system 124 may send a request to the registry system 104 that a particular NFT associated with a copyright and/or artifact is authentic and/or is otherwise legitimate. In this case, the third-party marketplace system 124 may display a plugin for the purchaser to select while accessing an interface (e.g., a webpage) presented to the purchaser. Selection of the plugin may automatically send identifying data associated with the NFT to be purchased (e.g., block value information, information associated with the artifact, information associated with the copyright, a copyright registration number, a certificate of ownership registration number, etc.) to the registry system 104. Once the registry system 104 receives the identifying information and the request to verify the NFT to be purchased, the verification component 144 may query the asset blacklist to determine that the NFT to be purchased has not been involved in an adverse event and/or an illegitimate transaction (e.g., stolen). The verification component 144 may send an indication to the third-party marketplace system 124 and/or a purchaser indicating a verification of the legitimacy of the NFT to be purchased.

The linking component 146 may be configured to associate one record with one or more other records in the asset registry 136. For example, when records are determined to be different versions of the same document and/or when records are associated with the same entity identifier, the linking component 146 may be utilized to generate an association between those records. Generating the association may include storing data indicating that the records are associated. Generating the association may also, or alternatively, include generating a link or other similar functionality that may be displayed along with a record via the user interface(s) 122. For example, the link may correspond to a selectable portion of the user interface(s) 122 that, when selected, may cause the linked record and/or a portion thereof to be displayed.

The access database component 148 may be configured to store data indicating details of access to one or more of the record associated with the asset registry 136. For example, access-control data may be stored in association with the registry system 104. The access-control data may indicate who is authorized to view a given record and/or given information associated with a record. In these examples, the access-control component 150 may be configured to require a user, in order to access a record, to authenticate the user's identity, such as by inputting a username and/or password, for example. As such, the registry system 104 may generate an access log that may indicate user identifiers for users that accessed a given record, a time value associated with access of the record, and/or what information was displayed and/or manipulated by the user. The access log may be utilized by the registry system 104 to assist in maintaining confidentiality and/or security of the artifact, copyright, reference NFT associated with a copyright and/or artifact, and/or minted NFT associated with an artifact and/or copyright. For example, alerts may be generated and/or sent when a record is accessed and/or when unusual activity is detected.

The third-party marketplace system 124 may include components such as, for example, one or more processors 152, one or more network interfaces 154, and/or memory 156. The memory 156 may include components such as, for example, a communications component 158, one or more user interfaces 160 a marketplace component 162, an application programming interface (API) component 164, a plugin component 165, and/or an artificial intelligence (AI) component 167. The components of the third-party marketplace system 124 will be described below by way of example. It should be understood that the example provided herein is illustrative, and should not be considered the exclusive example of the components of the third-party marketplace system 124. The communications component 158 and the user interfaces 160 may include the same or similar functionality as the communications component 118 and the user interfaces 122 of the electronic device 102 and be used to communicate with and interface with the electronic device 102, the registry system 104, the distributed-ledger system 106, and/or the insurer system 108.

The marketplace component 162 may be configured to enable entities to sell and/or purchase items associated with artifacts and/or copyrights. For example, the items for sale on the third-party marketplace system 124 may include artifacts that have copyrights, NFTs associated with artifacts, and/or NFTs associated with copyrights. In some cases, an entity, such as an entity associated with the electronic device 102, may access the marketplace component 162 in order to mint and sell NFTs associated with their artifact and/or copyright that they have previously registered with the registry system 104 (e.g., generated a reference NFT associated with the artifact and/or copyright). The third-party marketplace system 124 may verify the authenticity of the artifact and/or copyright by sending a verification request to the registry system 104. In some cases, the verification request is sent to the registry system 104 in response to the user selecting a plugin via the plugin component 165. The third-party marketplace system 124 may provide the registry system 104 with identifying data of the artifact and/or copyright (e.g., NFT data, name, certificate of ownership, seller name, etc.) and the registry system 104 may compare the identifying data to the data stored in the asset registry 136 in order to determine the authenticity of the item for sale.

In some cases, the third-party marketplace system 124 and/or a purchaser patronizing the third-party marketplace system 124 may send a request, via the plugin, to the registry system 104 that a previously minted NFT associated with a copyright and/or artifact is authentic and/or is otherwise legitimate. In this case, the third-party marketplace system 124 and/or the purchaser may provide identifying data associated with the NFT to be purchased (e.g., block value information, information associated with the artifact, information associated with the copyright, a copyright registration number, a certificate of ownership registration number, etc.). Once the registry system 104 receives the identifying information and the request to verify the NFT to be purchased, the registry system 104 may query the asset blacklist to determine that the NFT to be purchased has not been involved in an adverse event and/or an illegitimate transaction (e.g., stolen). The registry system 104 may send an indication to the third-party marketplace system 124 and/or a purchaser indicating a verification of the legitimacy of the NFT to be purchased.

The API component 164 may be configured to enable users of the third-party marketplace system 124 to interact with services provided by the registry system 104. For example, a purchasing entity accessing the marketplace component 162 to purchase an item, such as, an NFT associated with an artifact and/or copyright, may desire to authenticate the item to be purchased, obtain insurance on the item, and/or request an insurance claim on the item. The third-party marketplace system 124 may present the API component 164 such that the purchasing entity may interact with the registry system 104 in order to verify, insure, and/or issue an insurance claim on the item.

In some examples, the AI component 167 may be configured to enable entities to generate AI artifacts. For example, third-party marketplace system 124 may include and/or otherwise be associated with a generative AI vendor capable, via the AI component 167, of receiving prompts from a user in order to generate an AI artifact. In some cases, the AI component 167 may uses models trained on a large data set of content medium (text, images, audio, video) to create a new generative AI artifact.

As shown in FIG. 1, several of the components of the registry system 104, the distributed-ledger system 106, the insurer system 108, and/or the third-party marketplace system 124 and the associated functionality of those components as described herein may be performed by one or more of the other remote systems and/or by the electronic device 102. Additionally, or alternatively, some or all of the components and/or functionalities associated with the electronic device 102 may be performed by the registry system 104, the distributed-ledger system 106, the insurer system 108, and/or the third-party marketplace system 124.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 112, 152, and/or 126, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, 152, and/or 126 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, 152, and/or 126 may possess its own local memory, which also may store program components, program data, and/or one or more operating systems.

The memory 116, 156, and/or 130 may include volatile and nonvolatile memory, removable and non-removable media implemented in any method or technology for storage of information, such as non-transitory computer-readable instructions, data structures, program component, or other data. Such memory 116, 156, and/or 130 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, 156, and/or 130 may be implemented as computer-readable storage media ("CRSM"), which may be any available physical media accessible by the processor(s) 112, 152, and/or 126 to execute instructions stored on the memory 116, 156, and/or 130. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 116, 156, and/or 130, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 114, 154 and/or 128 may enable messages between the components and/or devices shown in architecture 100 and/or with one or more other remote systems, as well as other networked devices. Such network interface(s) 114, 154 and/or 128 may include one or more network interface controllers (NICs) or other types of transceiver devices to send and receive messages over the network 110.

For instance, each of the network interface(s) 114, 154 and/or 128 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114 and/or 128 may include a wide area network (WAN) component to enable message over a wide area network.

In some instances, the registry system 104 may be local to an environment associated the electronic device 102. For instance, the registry system 104 may be located within the electronic device 102. In some instances, some or all of the functionality of the registry system 104 may be performed by the electronic device 102. Also, while various components of the registry system 104 have been labeled and named in this disclosure and each component has been described as being configured to cause the processor(s) to perform certain operations, it should be understood that the described operations may be performed by some or all of the components and/or other components not specifically illustrated.

In some cases, any or all of the steps performed by the registry system 104 and the associated components may be done so using one or more machine learning models and/or by training one or more machine learning models. For example the communications component 132, the reference NFT generator 134, the asset registry 136, the artifact certification component 138, the policy component 140, the one or more wizards 142, the verification component 144, the linking component 146, the access database 148, and/or the access-control component 150 may utilize one or more machine learning models and/or by train one or more machine learning models to perform the respective operations discussed herein. As described herein, machine learned models may be generated using various machine learning techniques. For example, the models may be generated using one or more neural network(s). A neural network may be a biologically inspired algorithm or technique which passes input data through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from data. In some cases, the neural network may be a trained network architecture that is end-to-end. In one example, the machine learned models may include segmenting and/or classifying extracted deep convolutional features of data into semantic data. In some cases, appropriate truth outputs of the model in the form of semantic per-pixel classifications.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, ResNeXt101, VGG, DenseNet, PointNet, CenterNet and the like. In some cases, the system may also apply Gaussian blurs, Bayes Functions, color analyzing or processing techniques and/or a combination thereof.

FIG. 2 illustrates an example user interface 200 displaying asset verification functionality in accordance with an artifact and/or reference NFT registration and verification system. The user interface 200 may be displayed on a display of an electronic device, such as the electronic device 102 as described with respect to FIG. 1. The user interface 200 may be the same as or similar to the user interface(s) 122 as described with respect to FIG. 1.

For example, the user interface 200 may be presented to a user and include one or more artifacts that the user is interested in purchasing. In this case, the artifact 202 includes an NFT artwork titled "You #138." Although, it is to be understood that other types of artifacts (e.g., gaming NFTs, collectible NFTs, virtual real estate NFTs, domain NFTs, sports related NFTs, etc.) may be offered to be purchased via the interface 200. The interface 200 may include a plugin 204 usable by the purchaser to validate an authenticity of the artifact 202. For example, the third-party marketplace system 124 may display the plugin 204 for the purchaser to select while accessing an interface (e.g., a webpage) presented to the purchaser. Selection of the plugin 204 may automatically send identifying data associated with the artifact 202 to be purchased (e.g., block value information, information associated with the artifact, information associated with the copyright, a copyright registration number, a certificate of ownership registration number, etc.) to the registry system 104. Once the registry system 104 receives the identifying information and the request to verify the artifact 202 to be purchased, the verification component 144 may query the asset blacklist to determine that the artifact 202 to be purchased has not been involved in an adverse event and/or an illegitimate transaction (e.g., stolen). The verification component 144 may send an indication to the third-party marketplace system 124 and/or a purchaser indicating a verification of the legitimacy of the artifact 202 to be purchased. In this case, the indication indicates that the artifact 202 is a certified asset and is authorized to be purchased via the third-party marketplace system 124. In this example, the indication is illustrated in a pop-up window 206. However, the indication of certification and/or verification may be provided to the electronic device 102 via other communication means, such as a text message, an electronic mail message, etc.

Figure 3:
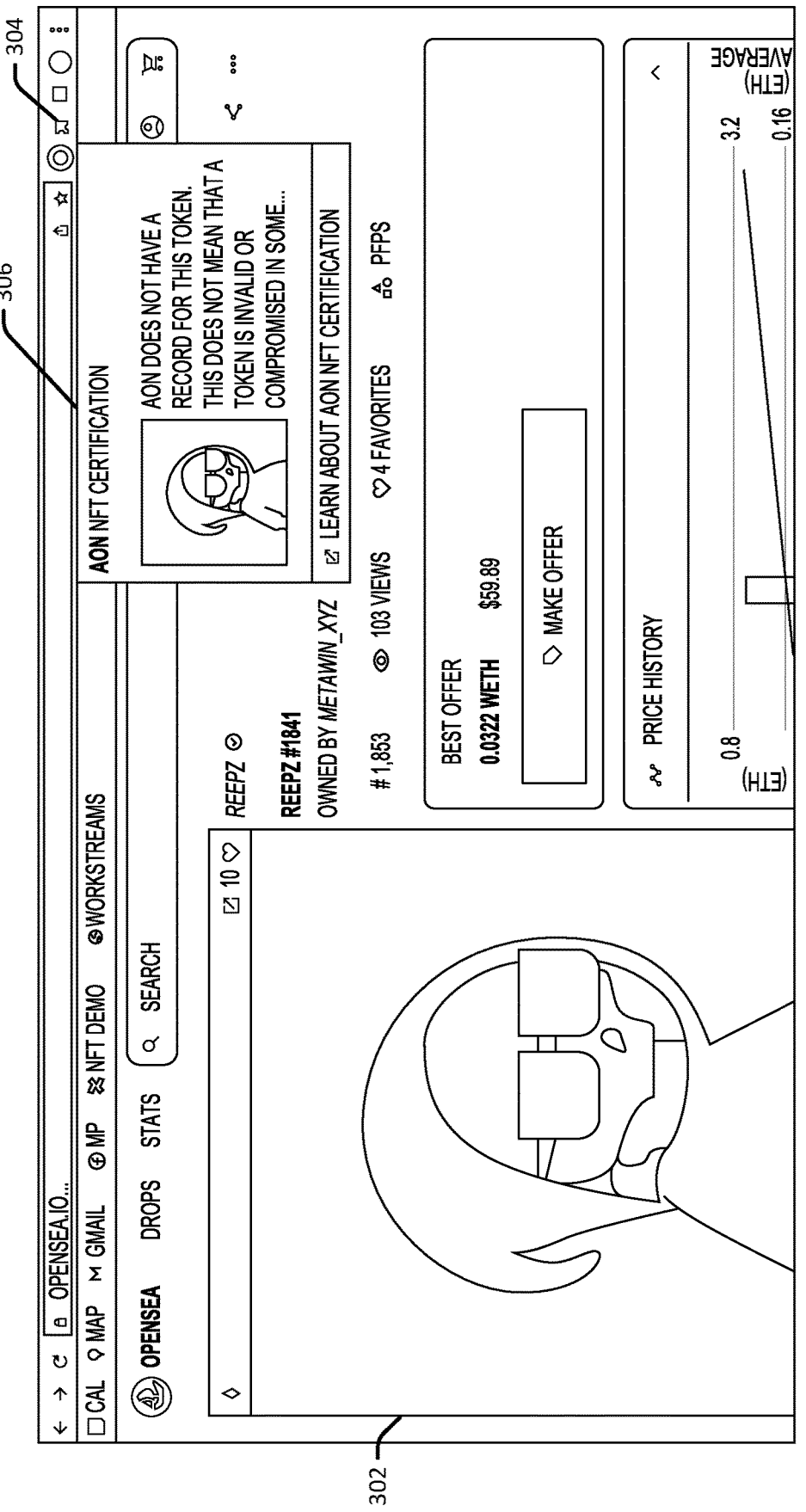
FIG. 3 illustrates another example user interface displaying artifact certification functionality in accordance with an artifact registration and verification system.

FIG. 3 illustrates an example user interface 300 displaying asset verification functionality in accordance with an artifact and/or reference NFT registration and verification system. The user interface 300 may be displayed on a display of an electronic device, such as the electronic device 102 as described with respect to FIG. 1. The user interface 300 may be the same as or similar to the user interface(s) 122 as described with respect to FIG. 1.

For example, the user interface 300 may be presented to a user and include one or more artifacts that the user is interested in purchasing. In this case, the artifact 302 includes an NFT artwork titled "reepz #1841." Although, it is to be understood that other types of artifacts (e.g., gaming NFTs, collectible NFTs, virtual real estate NFTs, domain NFTs, sports related NFTs, etc.) may be offered to be purchased via the interface 300. The interface 300 may include a plugin 304 usable by the purchaser to validate an authenticity of the artifact 302. For example, the third-party marketplace system 124 may display the plugin 304 for the purchaser to select while accessing an interface (e.g., a webpage) presented to the purchaser. Selection of the plugin 304 may automatically send identifying data associated with the artifact 302 to be purchased (e.g., block value information, information associated with the artifact, information associated with the copyright, a copyright registration number, a certificate of ownership registration number, etc.) to the registry system 104. Once the registry system 104 receives the identifying information and the request to verify the artifact 302 to be purchased, the verification component 144 may query the asset blacklist to determine that the artifact 302 to be purchased has not been involved in an adverse event and/or an illegitimate transaction (e.g., stolen). The verification component 144 may send an indication to the third-party marketplace system 124 and/or a purchaser indicating a verification of the legitimacy of the artifact 302 to be purchased. In this case, the indication indicates that the artifact 302 is an unrecognized asset. The indication may also indicate that, although the artifact 302 is an unrecognized asset, the indication may also indicate that this does not necessarily indicate that the artifact 302 is invalid or compromised in some way, but rather, that the registry system 104 did not receive any publishers registration of the artifact 302. In this example, the indication is illustrated in a pop-up window 306. However, the indication of certification and/or verification may be provided to the electronic device 102 via other communication means, such as a text message, an electronic mail message, etc.

Figure 4A:
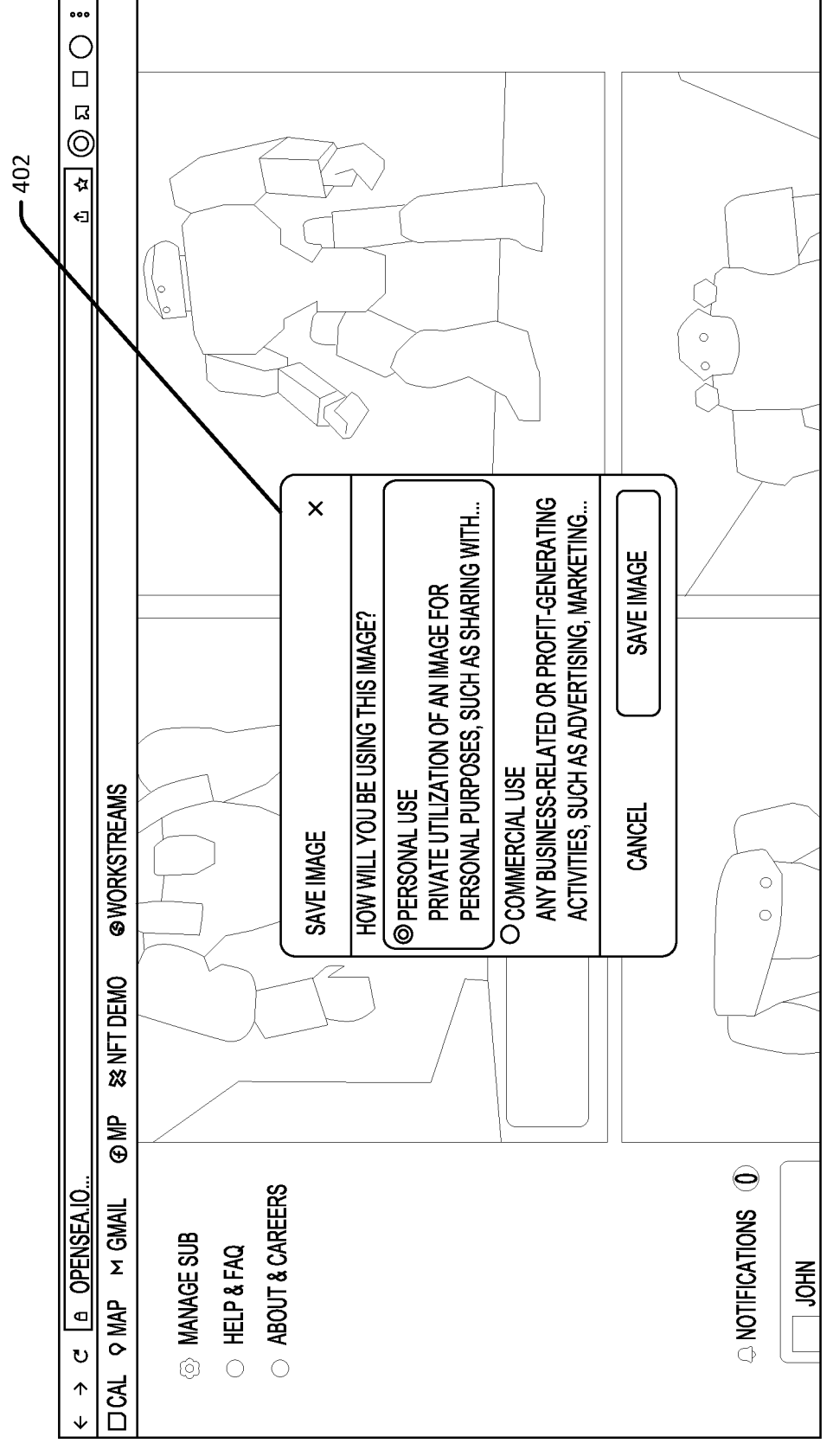
FIGS. 4A-4C illustrate example user interface displaying artifact registration functionality in accordance with an artifact registration and verification system.
Figure 4B:
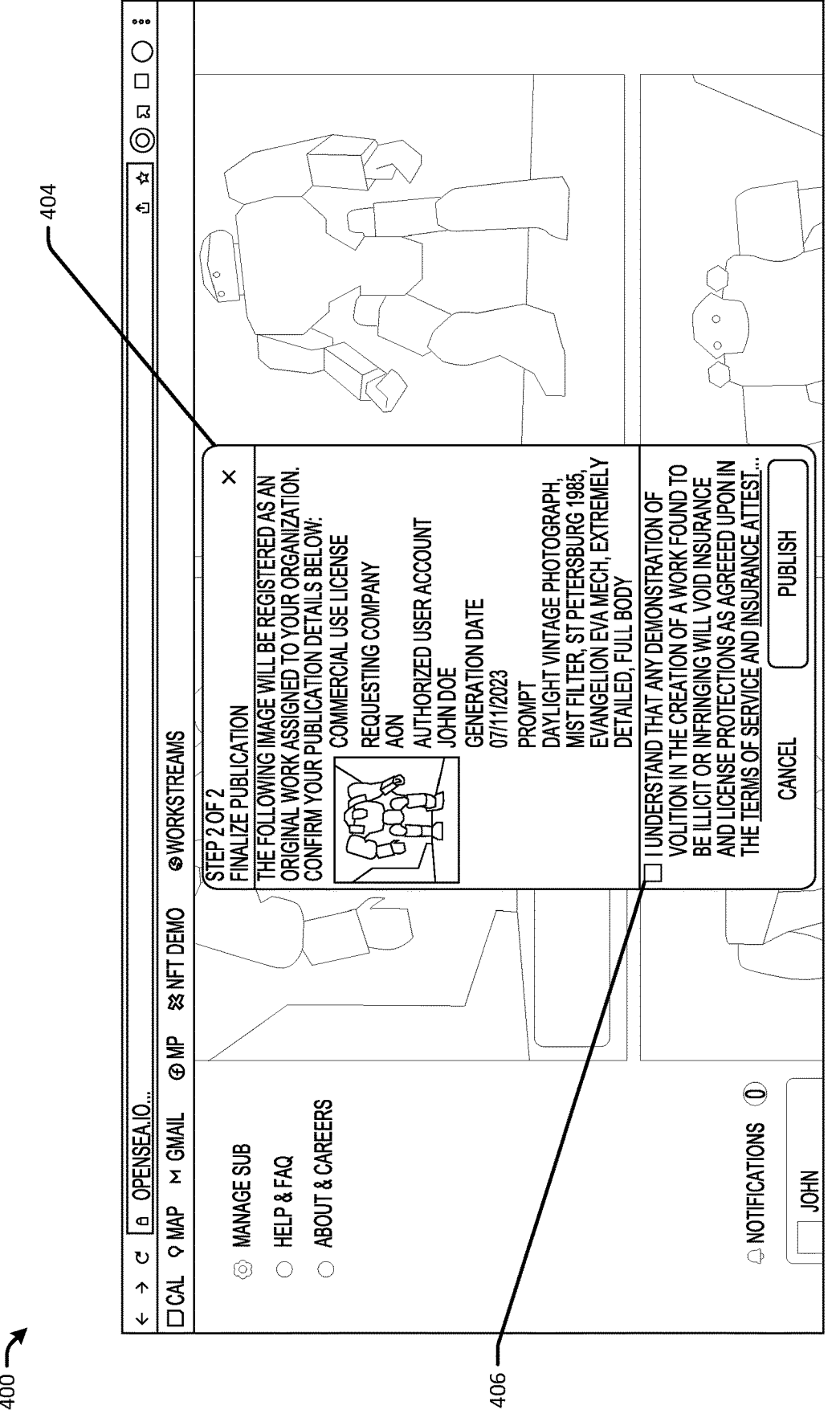
Figure 4C:
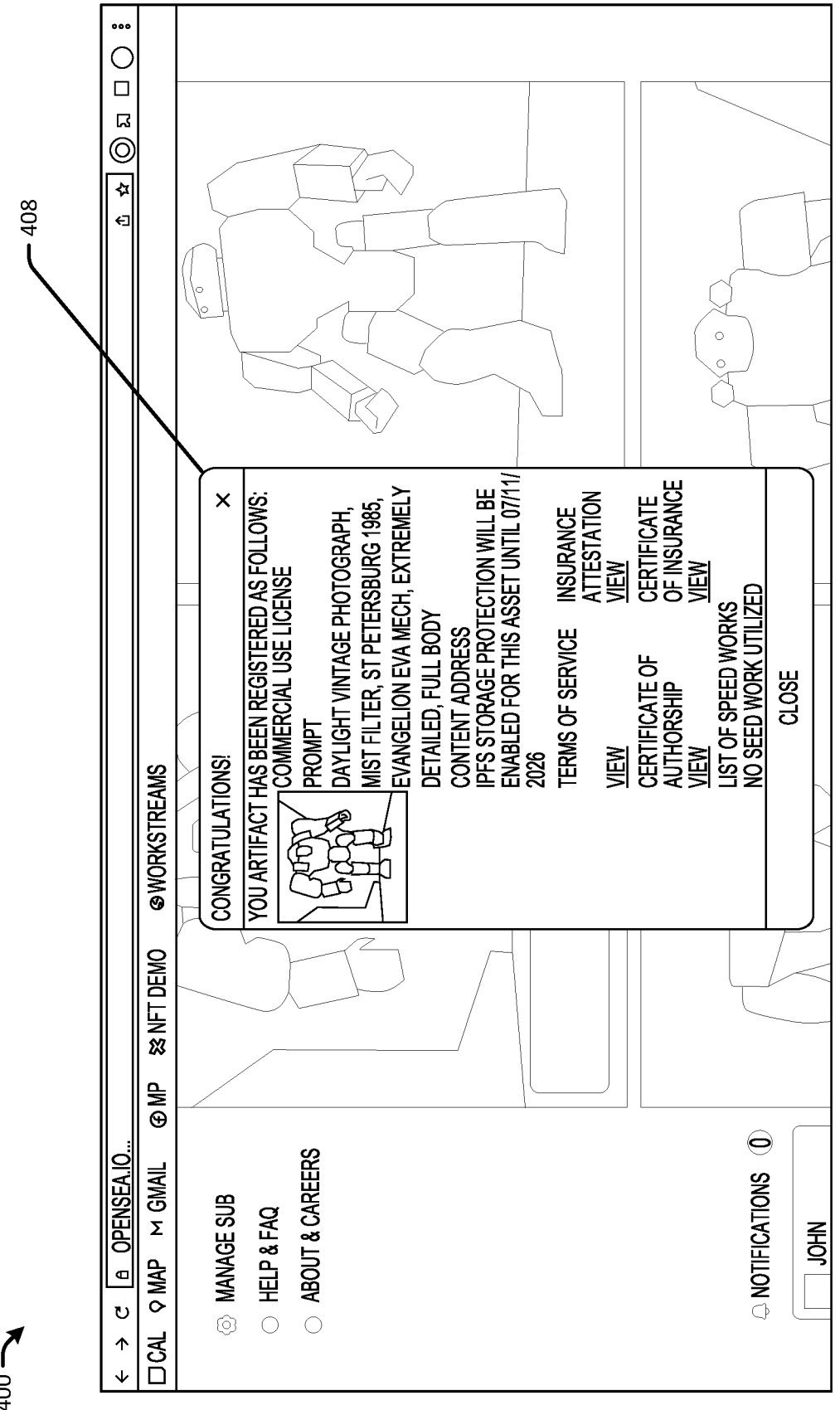

FIGS. 4A-4C illustrate an example user interface 400 displaying AI artifact generation in accordance with an artifact and/or reference NFT registration and verification system. The user interface 400 may be displayed on a display of an electronic device, such as the electronic device 102 as described with respect to FIG. 1. The user interface 400 may be the same as or similar to the user interface(s) 122 as described with respect to FIG. 1.

For example, the user interface 400 may be presented, e.g., via AI component 167, and may be configured to enable entities to generate AI artifacts. For example, third-party marketplace system 124 may include and/or otherwise be associated with a generative AI vendor capable, via the AI component 167, of receiving prompts from a user in order to generate an AI artifact. In some cases, the AI component 167 may uses models trained on a large data set of content medium (text, images, audio, video) to create a new generative AI artifact. Once the AI artifact is generated, the user interface may present a window 402 requesting the user to indicate whether the AI artifact is to be used for personal use (e.g., private utilization of an image for personal purposes, such as sharing with friends and family or using as a desktop wallpaper) or commercial use (e.g., any business-related or profit-generating activities, such as advertising, marketing, product packaging, or incorporation into a commercial website or publication). FIG. 4B illustrates a window 404 that may be displayed in response to selecting the "commercial use" option in window 402. The window 404 may include a number items of information for the user to confirm as well as a selectable option 406 for the user to acknowledge that the user agrees to understand that any demonstration of violation in the creation of a work found to be illicit or infringing will void insurance and license protections as agreed upon in the terms of service and insurance attestation. In some cases the items of information may include an image of the AI artifact, a requesting company, an authorized user account identifier, a generation date, prompt information, etc. FIG. 4C illustrates a window 408 that may be displayed in response to selecting the "publish" option in window 404. The window 408 may include an indication that the AI artifact has been registered in association with a commercial use license and has been recorded in the asset registry 136, using the techniques discussed herein. In some examples, the window 408 may include information items, such as an image of the AI artifact, a requesting company, an authorized user account identifier, a generation date, prompt information, a content address link, a terms of service link, an insurance attestation link, a certificate of authorship link, a certificate of insurance link, a list of seed works, etc.

Figure 5:
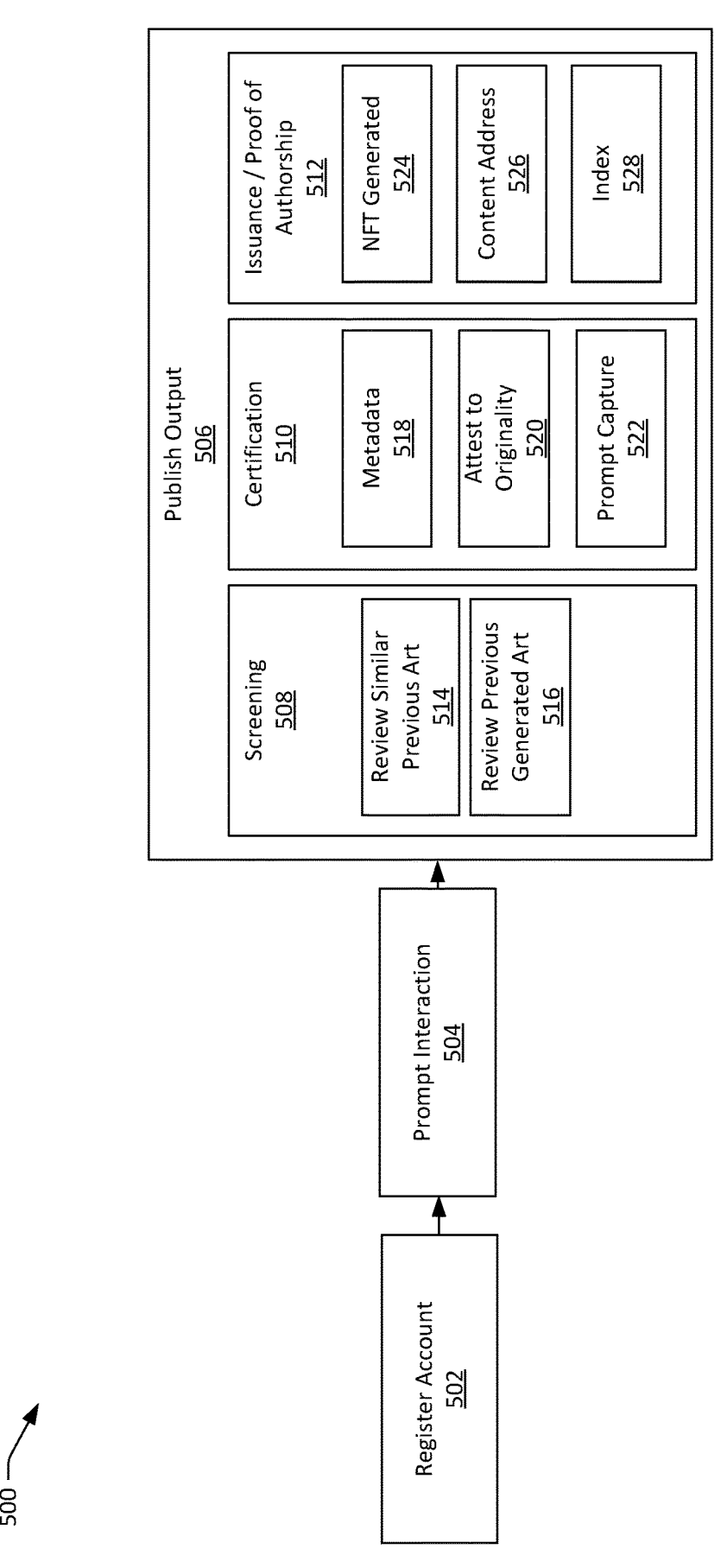
FIG. 5 illustrates a flow diagram of another example process for artifact registration in accordance with an artifact registration and verification system.

FIG. 5 illustrates a process 500 for artifact registration and management. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIG. 5, although the processes may be implemented in a wide variety of other environments, architectures and systems.

FIG. 5 illustrates a flow diagram of an example process 500 for generating and/or issuing a proof of authorship for a user in association with a generated AI artifact. The process 500 may begin at block 502 in which a user registers an account with a generative AI vendor, such as the third-party marketplace system 124.

Once an account is registered, the generative AI vendor and/or the registry system 104 may, at block 504, provide a prompt interact. For example, input data may include a prompt interaction for generating an AI artifact via a generative AI vendor. For example, the prompt may include a description of the subject that the user would like to create. This may include anything from a person, animal, or object to an abstract concept or emotion. In some examples, once the generative AI vendor has received the prompt information, the generative AI vendor may generate an AI artifact.

Once the AI artifact is generated, the registry system 104 may, at block 506, publish an output based on the AI artifact. In some cases, publishing the output based on the AI artifact may include screening at block 508, certification at block 510, and issuance and/or proof of authorship at block 512.

At block 508, the management system may screen a generated output against the original training corpus of artifacts, to identify the most "like" known artifacts. For example, at block 514, the management system may generate a similarity score (e.g., via generated vector representations of the AI artifact and the seed material items) between the AI artifact and each of the seed material items used to generate the AI artifact as well as a collection of publicly published works that may be accessed by a common crawl library. In some cases, in response to the similarity score being above a threshold value (e.g., above 50%), the management system may present the seed material items to the user for acknowledgement that the seed material items are or are not observably like works. In some cases, such as at block 516, the generated AI artifact may be screened against all artifacts associated with the management system that were previously generated by which to prevent collisions where a like previous work was assigned ownership to another party as a result of similar prompt input previously generated.

At block 510, once the generated AI artifact has been screened and the management system determines that the AI artifact is authentic (e.g., would not be deemed a "copy" of any of the seed material and/or another AI artifact), the management system may generate certification data that indicates a certification of the generated AI artifact. For instance, the management system may generate certification data that includes metadata 518 associated with the AI artifact (e.g., author information, date of generation information, AI vendor information, prompt information, etc.), attestation of originality 520 (an indication that the user agreed that the seed material are not observably like works to the AI artifact), and/or a prompt capture 522.

At block 512, once the certified data has been provided to the registry system, the registry system may provide an issuance and/or a proof of authorship to the user. For example, the registry system may generate a record in the asset registry. The record may include information associated with a reference token 524 associated with the AI artifact. For example, the record may include data indicating an identifier of the record, a naming indicator associated with the artifact, a description of the artifact, a naming indicator associated with the document, one or more tags associated with the artifact, a status indicator for the artifact, the certificate of ownership, a block number associated with the block of the blockchain that the certificate of ownership is registered with (e.g., content address 526), the cryptographic certificate of ownership value, the time value, an index value 528 of the AI artifact (e.g., a vector capture generated by the registry system for the AI artifact) and/or one or more other types of data associated with the artifact and/or registration of the artifact, such as valuation, insurance policy information, versioning information, etc. The registry system, in examples, may generate the proof of authorship 512 (e.g., confirmation data) indicating that the record has been generated, and the confirmation data may be sent to the client-side device and/or system for display, e.g., via a user interface, or otherwise made available for programmatic consumption by an outside system.

FIGS. 6-8 illustrate processes for artifact and/or reference token registration and verification. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures and systems.

FIG. 6 illustrates a flow diagram of an example process 600 for asset registration in accordance with an artifact and/or reference token registration and verification system. The order in which the operations or steps are described is not intended to be construed as a limitation, and any number of the described operations may be combined in any order and/or in parallel to implement process 600. The operations described with respect to the process 600 are described as being performed by the electronic device, and/or the registry system associated with the asset registry, and/or a distributed-ledger system associated with a blockchain. However, it should be understood that some or all of these operations may be performed by some or all of components, devices, and/or systems described herein.

At block 602, the process 600 may include the registry system determining that a user is accessing an NFT marketplace. For example, the third-party marketplace system 124 may be used to perform generation of artifacts (e.g., AI artifacts) and transactions involving artifacts, copyrights associated with artifacts, and/or minted NFTs associated with artifacts. In some cases, the third-party marketplace system 124 may desire to verify a minted NFT that is involved in a transaction via the registry system 104. Some or all of the devices and systems may be configured to communicate with each other via a network 110.

At block 604, the process 600 may include the registry system determining that the user selects a minted NFT. For example, a user interface 200 may be presented to a user and include one or more artifacts that the user is interested in purchasing. In this case, the artifact 202 includes an NFT artwork titled "You #138." Although, it is to be understood that other types of artifacts (e.g., gaming NFTs, collectible NFTs, virtual real estate NFTs, domain NFTs, sports related NFTs, etc.) may be offered to be purchased via the interface 200. The interface 200 may include a plugin 204 usable by the purchaser to validate an authenticity of the artifact 202. For example, the third-party marketplace system 124 may display the plugin 204 for the purchaser to select while accessing an interface (e.g., a webpage) presented to the purchaser. Selection of the plugin 204 may automatically send identifying data associated with the artifact 202 to be purchased (e.g., block value information, information associated with the artifact, information associated with the copyright, a copyright registration number, a certificate of ownership registration number, etc.) to the registry system 104. Once the registry system 104 receives the identifying information and the request to verify the artifact 202 to be purchased, the verification component 144 may query the asset blacklist to determine that the artifact 202 to be purchased has not been involved in an adverse event and/or an illegitimate transaction (e.g., stolen). The verification component 144 may send an indication to the third-party marketplace system 124 and/or a purchaser indicating a verification of the legitimacy of the artifact 202 to be purchased. In this case, the indication indicates that the artifact 202 is a certified asset and is authorized to be purchased via the third-party marketplace system 124. In this example, the indication is illustrated in a pop-up window 206. However, the indication of certification and/or verification may be provided to the electronic device 102 via other communication means, such as a text message, an electronic mail message, etc.

At block 606, the process 600 may include the registry system determining a verification status of the minted NFT based at least in part on referencing the reference NFT. By way of example, a user interface may receive input data that may indicate a document, for example, that represents or is used to describe an artifact and/or has been associated with a copyright. The electronic device may also be provided data associated with the artifact and/or copyright, such as, but not limited to, metadata associated with at least one of the copyright or the artifact (e.g., a filing date of the copyright, an assignee of the copyright, an age of the copyright, etc.), a digital representation of the artifact (e.g., an image file, an audio file, a video file, etc.), a valuation the copyright, a valuation of the artifact, or a copyright registration number.

In some examples, prior to generating a certificate of ownership and/or a reference NFT associated with the artifact and/or copyright, the registry system may perform a review process on the entity making the request in order to verify and/or authenticate that the entity is credible (e.g., legally owns the copyright, is a creator of the artifact, a legal representative of the owner of the copyright and/or the creator of the artifact, etc.) In some cases, the registry system may have access to data associated with the entity, such as, credit history, social security information, a DUNS listing, etc., and the registry system may access this information to authenticate the entity.

In some examples, the distributed-ledger system may receive the request data and the certificate of ownership associated with the copyright and/or artifact (or other data) and may register the certificate of ownership associated with the copyright and/or artifact (or the other data) in association with a block of the blockchain. The distributed-ledger system may generate a cryptographic certificate of ownership value (e.g., a reference NFT) representing the block in the blockchain and/or the distributed-ledger system may generate a time value indicating a time and/or day that the certificate of ownership value (or the other data) was registered with the blockchain. The distributed-ledger system may send the cryptographic certificate of ownership value, the time value, and/or other information (such as a block number, for example) to the registry system and/or the electronic device.

In some examples, the registry system may receive an indication that one or more minted NFTs associated with the artifact and/or a copyright has been involved in an adverse event and/or an illegitimate transaction and be flagged. For example, the entity that created the artifact and/or is associated (e.g., assigned) with the copyright of the artifact may offer for sale a number of NFTs associated with the copyright and/or artifact on a third-party marketplace. In cases where a purchaser of the NFT has the NFT stolen (e.g., stolen from their blockchain wallet) after legitimately purchasing the NFT from the marketplace, the purchaser may file an insurance claim with the registry system to recoup the loss of value. In some examples, receiving the insurance claim may indicate to the registry system that the minted NFT is no longer being held (e.g., stored in a blockchain wallet) by a legitimate entity and that the minted NFT should be flagged and/or added to an asset blacklist.

In some examples, an entity may inform the registry system that the minted NFT is no longer being held (e.g., stored in a blockchain wallet) by a legitimate entity and that the minted NFT should be flagged and/or added to an asset blacklist without having to file for an insurance claim. For example, the entity and/or the insurance claim may include identifying information associated with the artifact associated with the minted NFT. The registry system may then check the asset registry to determine if a reference token is stored for the artifact and what, if any, contractual obligations (e.g., insurance policies) may be associated with the artifact and/or reference token.

At block 608, the process 600 may include the registry system presenting a selectable plug-in on a graphical user interface (GUI) of a computing device. For example, the third-party marketplace may display a plugin for the purchaser to select while accessing an interface (e.g., a webpage) presented to the purchaser.

At block 610, the process 600 may include the registry system presenting, in response to receiving a selection of the selectable plug-in, the verification status of the minted NFT. For example, selection of the plugin may automatically send identifying data associated with the NFT to be purchased (e.g., block value information, information associated with the artifact, information associated with the copyright, a copyright registration number, a certificate of ownership registration number, etc.) to the registry system. Once the registry system receives the identifying information and the request to verify the NFT to be purchased, the registry system may query the asset blacklist to determine that the NFT to be purchased has not been involved in an adverse event and/or an illegitimate transaction (e.g., stolen). The registry system may send an indication to the third-party marketplace and/or a purchaser indicating a verification of the legitimacy of the NFT to be purchased.

Additionally and/or alternatively, the process 600 may include receiving a block value generated by a distributed-ledger system that is associated with the artifact, the block value representing a block in a blockchain of the distributed-ledger system and the reference non-fungible token (NFT) associated with the artifact.

Additionally and/or alternatively, the process 600 may include the event comprising an adverse event, the operations further comprising: flagging the minted NFT as having been involved in the adverse event based at least in part on determining that the minted NFT is associated with the artifact, receiving a query from a marketplace including identifying information associated with the minted NFT, and sending an indication to the marketplace that the minted NFT has been flagged as having been involved in an adverse event.

Additionally and/or alternatively, the process 600 may include flagging the minted NFT comprising adding the identifying information associated with the minted NFT to a blacklist.

Additionally and/or alternatively, the process 600 may include receiving the indication that the minted NFT has been involved in the adverse event comprising receiving an insurance claim associated with an insurance policy of the reference NFT.

Additionally and/or alternatively, the process 600 may include receiving an insurance claim associated with the insurance policy, determining one or more additional minted NFTs as being similar to the minted NFT, determining at least one of an average value increase or an average value decrease associated with the one or more additional minted NFTs, and determining an amount to pay in response to the insurance claim and at least one of the average value increase or the average value decrease associated with the one or more additional minted NFTs.

Additionally and/or alternatively, the process 600 may include the reference NFT being associated with at least one contractual obligation agreed to by the entity, the at least one contractual obligation comprising at least one of an assignment of rights of a copyright associated with the artifact, an attestation to accept legal liability, or an attestation to accept financial liability Additionally and/or alternatively, the process 600 may include the verification status comprising a certification that the minted NFT is approved to be sold by the entity Additionally and/or alternatively, the process 600 may include receiving the indication that the minted NFT has been involved in the event comprising receiving a message from a purchaser of the minted NFT that the minted NFT was stolen from the purchaser.

FIG. 7 illustrates a flow diagram of an example process 700 for artifact and/or reference NFT registration and verification in accordance with an artifact and/or reference NFT registration and verification system. The order in which the operations or steps are described is not intended to be construed as a limitation, and any number of the described operations may be combined in any order and/or in parallel to implement process 700. The operations described with respect to the process 700 are described as being performed by a registry system. However, it should be understood that some or all of these operations may be performed by some or all of components, devices, and/or systems described herein.

At block 702, the process 700 may include the registry system receiving, from an electronic device, input data requesting to generate an artificial intelligence (AI) based artifact. For example, input data may include a prompt interaction for generating an AI artifact via a generative AI vendor. For example, the prompt may include a description of the subject that the user would like to create. This may include anything from a person, animal, or object to an abstract concept or emotion. In some cases, the input data may include the seed material used to generate the AI artifact.

At block 704, the process 700 may include the registry system presenting a selectable option for identifying a type of usage of the (AI) based artifact. For example, once the AI artifact is generated, the user interface may present a window requesting the user to indicate whether the AI artifact is to be used for personal use (e.g., private utilization of an image for personal purposes, such as sharing with friends and family or using as a desktop wallpaper) or commercial use (e.g., any business-related or profit-generating activities, such as advertising, marketing, product packaging, or incorporation into a commercial website or publication).

At block 706, the process 700 may include the registry system identifying, based at least in part on the type of usage, seed material used by an AI model to generate the AI based artifact. For example, after the AI vendor receives the user prompts and generates the AI artifact, the management system may receive (e.g., from the AI vendor and/or the client-side device) the seed material used by the AI vendor to generate the AI artifact.

At block 708, the process 700 may include the registry system determining a similarity score between the AI based artifact and a collection of publicly published works. For example, the management system may screen a generated output against the original training corpus of artifacts, to identify the most "like" known artifacts. For example the management system may generate a similarity score (e.g., via generated vector representations of the AI artifact and the seed material items) between the AI artifact and each of the seed material items used to generate the AI artifact as well as a collection of publicly published works that may be accessed by a common crawl library. In some cases, in response to the similarity score being above a threshold value (e.g., above 50%), the management system may present the seed material items to the user for acknowledgement that the seed material items are or are not observably like works. In some cases the generated AI artifact may be screened against all artifacts associated with the management system that were previously generated by which to prevent collisions where a like previous work was assigned ownership to another party as a result of similar prompt input previously generated.

At block 710, the process 700 may include the registry system generating, based at least in part on the similarity score, an insurance policy associated with the AI based artifact. For example, a policy component 140 may be configured to assist in the application, underwriting, and provision of one or more insurance policies for a given artifact (e.g., generated AI artifact), copyright, reference NFT associated with a copyright and/or artifact, and/or minted NFT associated with an artifact and/or copyright. For example, once registered with the asset registry 136, an option may be presented to gain insurance coverage on the artifact, copyright, reference NFT associated with a copyright and/or artifact, and/or minted NFT associated with an artifact and/or copyright. For example, a selectable portion of the user interface 122 may provide the option to apply for an insurance policy. When selected, the user interface 122 may display one or more dialog boxes and/or input fields configured to receive user input regarding application for an insurance policy. This information may include, for example, information relating to the applicant, the artifact, a copyright and/or reference NFT associated with a copyright type or category, a value of the copyright and/or reference NFT associated with a copyright (either determined from above or identified by the user), a desired policy period, desired policy limits and retention, an entity value, a date of creation of the copyright and/or reference NFT associated with a copyright and/or artifact, and/or a portion enabling uploading of supporting and/or requested documentation. In examples where supporting documentation is provided, the supporting documentation may be registered with the blockchain in the same or a similar manner as described above with respect to the supporting document for artifact valuation.

At block 712, the process 700 may include the registry system presenting, on the electronic device, a selectable option to accept or decline the insurance policy. For example, the insurance policy may be presented on the electronic device 102.

Additionally and/or alternatively, the process 700 may include the type of usage including a commercial use or a personal use.

Additionally and/or alternatively, the process 700 may include the collection of publicly published works being obtained via a common crawl library.

Additionally and/or alternatively, the process 700 may include receiving an insurance claim associated with the AI based artifact that indicates that the AI based artifact is determined to be infringing and resulted in damages to an acquiring party, determining if the insurance claim is valid based on the acquiring party's volition, the volition being determined based at least in part on: the input data including at last one of a reference to a trademark, a reference to a commercial likeness of a copyright work, a reference to a seed image reference, or a failure to identify in a publishing review step that a work of substantial similarity is already in existence.

Additionally and/or alternatively, the process 700 may include presenting a commercial use license option that includes a selectable option to publish the AI based artifact causing the AI based artifact to be registered as an original work assigned to an entity associated with the electronic device.

Additionally and/or alternatively, the process 700 may include the commercial use license option including at least one of prompt information, a URL address to access the AI based artifact, terms of use information, insurance attestation, certificate of authorship, certificate of insurance, or a list of see material.

Additionally and/or alternatively, the process 700 may include presenting a prompt to a user to identify observably like works similar to the AI based artifact, wherein presenting the prompt is based at least in part on the similarity score.

Additionally and/or alternatively, the process 700 may include receiving an insurance claim associated with the AI based artifact, determining one or more additional AI based artifacts being similar to the AI based artifact, determining at least one of an average value increase or an average value decrease associated with the one or more additional AI based artifacts, and determining an amount to pay in response to the insurance claim and at least one of the average value increase or the average value decrease associated with the one or more additional AI based artifacts.

Additionally and/or alternatively, the process 700 may include the insurance policy being associated with at least one contractual obligation agreed to by the entity, the at least one contractual obligation comprising at least one of an assignment of rights of a copyright associated with the artifact, an attestation to accept legal liability, or an attestation to accept financial liability.

Additionally and/or alternatively, the process 700 may include receiving a block value generated by a distributed-ledger system that is associated with the AI based artifact, the block value representing a block in a blockchain of the distributed-ledger system and a reference non-fungible token (NFT) associated with the artifact.

Additionally and/or alternatively, the process 700 may include maintaining a blockchain based system of record storing a proof of authorship that references attributes of the AI based artifact, a date of creation of the AI based artifact, a content address associated with the AI based artifact, author identification associated with the AI based artifact, or an organization associated with the AI based artifact.

FIG. 8 illustrates a flow diagram of an example process 800 for artifact and/or reference NFT registration and verification in accordance with an artifact and/or reference NFT registration and verification system. The order in which the operations or steps are described is not intended to be construed as a limitation, and any number of the described operations may be combined in any order and/or in parallel to implement process 800. The operations described with respect to the process 700 are described as being performed by a registry system. However, it should be understood that some or all of these operations may be performed by some or all of components, devices, and/or systems described herein.

At block 802, the process 800 may include the registry system receiving, from an electronic device, input data requesting to generate an artificial intelligence (AI) based artifact. For example, input data may include a prompt interaction for generating an AI artifact via a generative AI vendor. For example, the prompt may include a description of the subject that the user would like to create. This may include anything from a person, animal, or object to an abstract concept or emotion. In some cases, the input data may include the seed material used to generate the AI artifact.

At block 804, the process 800 may include the registry system presenting a selectable option for identifying a type of usage of the (AI) based artifact. For example, once the AI artifact is generated, the user interface may present a window requesting the user to indicate whether the AI artifact is to be used for personal use (e.g., private utilization of an image for personal purposes, such as sharing with friends and family or using as a desktop wallpaper) or commercial use (e.g., any business-related or profit-generating activities, such as advertising, marketing, product packaging, or incorporation into a commercial website or publication).

At block 806, the process 800 may include the registry system identifying, based at least in part on the type of usage, seed material used by an AI model to generate the AI based artifact. For example, after the AI vendor receives the user prompts and generates the AI artifact, the management system may receive (e.g., from the AI vendor and/or the client-side device) the seed material used by the AI vendor to generate the AI artifact.

At block 808, the process 800 may include the registry system determining a similarity score between the AI based artifact and a collection of publicly published works. For example, the management system may screen a generated output against the original training corpus of artifacts, to identify the most "like" known artifacts. For example, the management system may generate a similarity score (e.g., via generated vector representations of the AI artifact and the seed material items) between the AI artifact and each of the seed material items used to generate the AI artifact as well as a collection of publicly published works that may be accessed by a common crawl library. In some cases, in response to the similarity score being above a threshold value (e.g., above 50%), the management system may present the seed material items to the user for acknowledgement that the seed material items are or are not observably like works. In some cases, the generated AI artifact may be screened against all artifacts associated with the management system that were previously generated by which to prevent collisions where a like previous work was assigned ownership to another party as a result of similar prompt input previously generated.

At block 810, the process 800 may include the registry system determining that the AI based artifact is an original work based at least in part on the similarity score. For example, once the generated AI artifact has been screened and the management system determines that the AI artifact is authentic (e.g., would not be deemed a "copy" of any of the seed material and/or another AI artifact), the management system may generate certification data that indicates a certification of the generated AI artifact. For instance, the management system may generate certification data that includes metadata associated with the AI artifact (e.g., author information, date of generation information, AI vendor information, prompt information, etc.), an attestation of originality, and/or a prompt capture.

At block 812, the process 800 may include the registry system receiving a block value generated by a distributed-ledger system that is associated with the AI based artifact, the block value representing a block in a blockchain of the distributed-ledger system and a reference non-fungible token (NFT) associated with the artifact and at block 814, the process 800 may include the registry system maintaining a blockchain based system of record storing a proof of authorship that references attributes of the AI based artifact, a date of creation of the AI based artifact, a content address associated with the AI based artifact, author identification associated with the AI based artifact, or an organization associated with the AI based artifact. For example, the client-side device and/or management system may send, to a registry system, the input data, the certification data, and, in examples, request data indicating a request to register, in association with an asset registry, a certificate of ownership associated with the copyright and/or the artifact (e.g., the NFT and/or the AI artifact). The registry system may receive the input data, the certification data, and/or the request data and may initiate a process of generating a certificate of ownership (e.g., a reference NFT) associated with the copyright and/or the artifact and registering the certificate of ownership in association with the asset registry. For example, the registry system may send the input data, the certification data, and/or request data to a blockchain system managing one or more blockchains. The request data may indicate a request to register the certificate of ownership and/or identifying information associated with the certificate of ownership with the blockchain. The blockchain system may register the certificate of ownership and/or the other information described herein in association with a block of the blockchain. A cryptographic certificate of ownership value may be generated by the registry system that may represent the block in the blockchain. Additionally, or alternatively, a time value may be determined that indicates a time and/or day at which the certificate of ownership and/or the other information described herein was registered with the blockchain. The blockchain system may then send the cryptographic certificate of ownership value to the registry system associated with the asset registry. The blockchain system may additionally, or alternatively, send the cryptographic certificate of ownership value to the client-side device, particularly in instances where the request data to register the certificate of ownerships was received from the client-side device. In some examples, the cryptographic certificate of ownership value may be referred to as a "reference token," which may act as the point of inception for traceability. The reference token may establish the ongoing verification mechanism that would enable the flagging of events which involve compromised assets or transfer to a secondary blacklist for "known bad" wallets.

Additionally and/or alternatively, the process 800 may include the type of usage including a commercial use or a personal use.

Additionally and/or alternatively, the process 800 may include presenting a commercial use license option that includes a selectable option to publish the AI based artifact causing the AI based artifact to be registered as an original work assigned to an entity associated with the electronic device.

Additionally and/or alternatively, the process 800 may include the commercial use license option including at least one of prompt information, a URL address to access the AI based artifact, terms of use information, insurance attestation, certificate of authorship, certificate of insurance, or a list of see material.

Additionally and/or alternatively, the process 800 may include presenting a prompt to a user to identify observably like works similar to the AI based artifact, wherein presenting the prompt is based at least in part on the similarity score.

Additionally and/or alternatively, the process 800 may include receiving an insurance claim associated with the AI based artifact, determining one or more additional AI based artifacts being similar to the AI based artifact, determining at least one of an average value increase or an average value decrease associated with the one or more additional AI based artifacts, and determining an amount to pay in response to the insurance claim and at least one of the average value increase or the average value decrease associated with the one or more additional AI based artifacts.

Additionally and/or alternatively, the process 700 may include the insurance policy being associated with at least one contractual obligation agreed to by the entity, the at least one contractual obligation comprising at least one of an assignment of rights of a copyright associated with the artifact, an attestation to accept legal liability, or an attestation to accept financial liability.

Additionally and/or alternatively, the process 700 may include receiving a block value generated by a distributed-ledger system that is associated with the AI based artifact, the block value representing a block in a blockchain of the distributed-ledger system and a reference non-fungible token (NFT) associated with the artifact.

Additionally and/or alternatively, the process 700 may include maintaining a blockchain based system of record storing a proof of authorship that references attributes of the AI based artifact, a date of creation of the AI based artifact, a content address associated with the AI based artifact, author identification associated with the AI based artifact, or an organization associated with the AI based artifact.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:

one or more processors; and non-transitory computer-readable media storing computer-executable instructions that, when executed by the one or more processors, cause the one or more processors to perform operations comprising:

receiving, from an electronic device, input data requesting to generate an artificial intelligence (AI) based artifact;

enabling functionality of a configurable wizard based on the input data;

presenting, dynamically utilizing the configurable wizard, a selectable option for identifying a type of usage of the (AI) based artifact;

identifying, based at least in part on the type of usage as acquired utilizing the configurable wizard, seed material used by an AI model to generate the AI based artifact, wherein identifying the seed material includes parsing the seed material from other material such that a limited amount of relevant data is sent to and utilized by the AI model, reducing computational resources utilized by the AI model to generate the AI based artifact;

determining a similarity score between a first vector of the AI based artifact and vectors of a collection of publicly published works, wherein determining the similarity score is performed utilizing a vector comparison indicating distances between vectors in a computer-centric vector space;

generating, based at least in part on the similarity score, an insurance policy associated with the AI based artifact;

presenting, on the electronic device, a selectable option to accept or decline the insurance policy;

receiving an insurance claim associated with the AI based artifact; and determining an amount to pay in response to the insurance claim based on a claim of inadvertent infringement via use of the AI based artifact.

2. The system of claim 1, wherein the collection of publicly published works is obtained via a common crawl library.

3. The system of claim 1, the operations further comprising presenting a selectable option to publish the AI based artifact causing the AI based artifact to be registered as an original work assigned to an entity associated with the electronic device.

4. The system of claim 3, wherein the selectable option includes at least one of prompt information, a URL address to access the AI based artifact, terms of use information, insurance attestation, certificate of authorship, certificate of insurance, or a list of see material.

5. The system of claim 1, the operations further comprising presenting a prompt to a user to identify observably like works similar to the AI based artifact, wherein presenting the prompt is based at least in part on the similarity score.

6. The system of claim 1, wherein the insurance policy is associated with at least one contractual obligation agreed to by an entity, the at least one contractual obligation comprising at least one of an assignment of rights of a copyright associated with the AI based artifact, an attestation to accept legal liability, or an attestation to accept financial liability.

7. The system of claim 1, the operations further comprising receiving a block value generated by a distributed-ledger system that is associated with the AI based artifact, the block value representing a block in a blockchain of the distributed-ledger system and a reference non-fungible token (NFT) associated with the AI based artifact.

8. The system of claim 1, the operations further comprising maintaining a blockchain based system of record storing a proof of authorship that references attributes of the AI based artifact, a date of creation of the AI based artifact, a content address associated with the AI based artifact, author identification associated with the AI based artifact, or an organization associated with the AI based artifact.

9. A method, comprising:

receiving, from an electronic device, input data requesting to generate an artificial intelligence (AI) based artifact;

enabling functionality of a configurable wizard based on the input data;

identifying, based at least in part on a type of usage as acquired utilizing the configurable wizard, seed material used by an AI model to generate the AI based artifact, wherein identifying the seed material includes parsing the seed material from other material such that a limited amount of relevant data is sent to and utilized by the AI model, reducing computational resources utilized by the AI model to generate the AI based artifact;

determining a similarity score between a first vector of the AI based artifact and vectors of a collection of publicly published works, wherein determining the similarity score is performed utilizing a vector comparison indicating distances between vectors in a computer-centric vector space;

generating, based at least in part on the similarity score, an insurance policy associated with the AI based artifact;

presenting, on the electronic device, a selectable option to accept or decline the insurance policy;

receiving an insurance claim associated with the AI based artifact; and determining an amount to pay in response to the insurance claim based on a claim of inadvertent infringement via use of the AI based artifact.

10. The method of claim 9, wherein the collection of publicly published works is obtained via a common crawl library.

11. The method of claim 9, further comprising presenting a commercial use license option that includes a selectable option to publish the AI based artifact causing the AI based artifact to be registered as an original work assigned to an entity associated with the electronic device.

12. The method of claim 11, wherein the commercial use license option includes at least one of prompt information, a URL address to access the AI based artifact, terms of use information, insurance attestation, certificate of authorship, certificate of insurance, or a list of seed material.

13. The method of claim 9, further comprising presenting a prompt to a user to identify observably like works similar to the AI based artifact, wherein the similarity score is based at least in part on a response from the user to the prompt.

14. The method of claim 13, wherein the AI based artifact that indicates that the AI based artifact is determined to be infringing and resulted in damages to an acquiring party, and the method further comprises:

determining if the insurance claim is valid based on a volition of the acquiring party, the volition being determined based at least in part on:

the input data including at last one of a reference to a trademark, a reference to a commercial likeness of a copyright work, a reference to a seed image reference; or a failure to identify in a publishing review step that a work of substantial similarity is already in existence.

15. The method of claim 9, wherein the insurance policy is associated with at least one contractual obligation agreed to by an entity, the at least one contractual obligation comprising at least one of an assignment of rights of a copyright associated with the AI based artifact, an attestation to accept legal liability, or an attestation to accept financial liability.

\* \* \* \* \*